(12) United States Patent
Igarashi

(10) Patent No.: US 6,747,429 B2
(45) Date of Patent: Jun. 8, 2004

(54) PRINT CONTROL SYSTEM, PRINT CONTROL METHOD, AND RECORDING MEDIUM HAVING RECORDED PRINT CONTROL PROGRAM

(75) Inventor: Hitoshi Igarashi, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 88 days.

(21) Appl. No.: 09/956,797

(22) Filed: Sep. 21, 2001

(65) Prior Publication Data

US 2002/0039119 A1 Apr. 4, 2002

(30) Foreign Application Priority Data

Sep. 21, 2000 (JP) .......................................... 2000-286449

(51) Int. Cl.[7] .......................... G05B 11/01; G05B 19/18; B41J 29/38; B65H 9/00
(52) U.S. Cl. ..................... 318/560; 318/568.1; 318/603; 347/16; 271/226
(58) Field of Search ................................ 318/560, 565, 318/567, 568.1, 603, 626, 272, 278, 466; 347/5, 16, 19; 271/3.12, 3.13, 226, 227, 228

(56) References Cited

U.S. PATENT DOCUMENTS

| 4,551,664 A | 11/1985 | Wong et al. ................. 318/592 |
| 4,742,287 A | * 5/1988 | Yokoi et al. ................. 318/696 |
| 4,810,941 A | 3/1989 | Ohishi et al. ................ 318/314 |
| 4,924,165 A | 5/1990 | Kohno ........................ 318/592 |
| 6,309,063 B1 | * 10/2001 | Kamano et al. ............. 347/104 |
| 6,418,274 B2 | * 7/2002 | Tanaka ........................ 388/800 |
| 6,528,962 B1 | * 3/2003 | Igarashi et al. ............. 318/461 |

FOREIGN PATENT DOCUMENTS

| EP | 0 066 159 A1 | 12/1982 | ............ H02D/8/00 |
| JP | 06014597 A | * 1/1994 | ............ H02P/8/00 |
| JP | 06054596 A | * 2/1994 | ............ H02P/8/00 |

* cited by examiner

Primary Examiner—Rina Duda
Assistant Examiner—Edgardo San Martin
(74) Attorney, Agent, or Firm—Sughrue Mion, PLLC

(57) ABSTRACT

A print control system according to the present invention comprises: a paper rear edge holding/driving control part for driving and controlling a paper feed motor so that the rear edge of a paper, which is fed by the paper feed motor, is held in a predetermined holding region; a usual paper feed control part for controlling the paper feed motor so as to carry out a usual paper feed operation; and a control selecting part for selecting one of the paper rear edge holding/driving control part and the usual paper feed control part on the basis of the kind and feed amount of the paper and the presence of detection of the rear edge of the paper.

24 Claims, 22 Drawing Sheets

FIG. 7A MOTOR CURRENT
BACKGROUND ART

FIG. 7B MOTOR SPEED
BACKGROUND ART

PRINT CONTROL SYSTEM, PRINT CONTROL METHOD, AND RECORDING MEDIUM HAVING RECORDED PRINT CONTROL PROGRAM

BACKGROUND OF THE INVENTION

1. Field of The Invention

The present invention relates to a print control system, a print control method, and a recording medium in which a print control program has been recorded. The invention is particularly used for the control of a paper feed operation.

2. Related Background Art

Referring to FIGS. 1 through 7, a conventional print control system will be described below. This print control system is used for an ink jet printer. The schematic construction of this ink jet printer is shown in FIG. 1.

This ink jet printer comprises: a paper feed motor (which will be also hereinafter referred to as a PF motor) 1 for feeding a paper; a paper feed motor driver 2 for driving the paper feed motor 1; a carriage 3; a carriage motor (which will be also hereinafter referred to as a CR motor) 4 for driving the carriage 3; a CR motor driver 5 for driving the carrier motor 4; a DC unit 6; a pump motor 7 for controlling the suction of ink for preventing clogging; a pump motor driver 8 for driving the pump motor 7; a head 9 which is fixed to the carriage 3 for discharging ink to a printing paper 50; a head driver 10 for driving and controlling the head 9; a linear type encoder 11 which is fixed to the carriage 3; a code plate 12 which has slits at regular intervals; a rotary type encoder 13 for the PF motor 1; a paper detecting sensor 15 for detecting the position of the rear edge of a paper which is being printed; a CPU 16 for controlling the whole printer; a timer IC 17 for periodically generating an interruption signal to output the signal to the CPU 16; an interface part (which will be also hereinafter referred to as an IF) 19 for sending and receiving data to and from a host computer 18; an ASIC 20 for controlling printing resolution, the driving waveform of the head 9 and so forth, on the basis of printing information which is fed from the host computer 18 via the IF 19; a PROM 21, a RAM 22 and an EEPROM 23 which are used as work and program storage areas for the ASIC 20 and the CPU 16; a platen 25 for supporting thereon a paper 50 during printing; a carrier roller 27 which is driven by the PF motor 1 for carrying the printing paper 50; a pulley 30 which is mounted on the rotating shaft of the CR motor 4; and a timing belt 31 which is driven by the pulley 30.

Furthermore, the DC unit 6 is designed to drive and control the paper feed motor driver 2 and the CR motor driver 5 on the basis of a control command, which is fed from the CPU 16, and the outputs of the encoder 11 and 13. In addition, each of the paper feed motor 1 and the CR motor 4 comprises a DC motor.

The peripheral construction of the carriage 3 of this ink jet printer is shown in FIG. 2.

The carriage 3 is connected to the carriage motor 4 via the pulley 30 by means of the timing belt 31. The carriage 3 is driven to be guided by a guide member 22 so as to move in parallel to the platen 25. The surface of the carriage 3 facing the printing paper is provided with the recording head 9 which comprises a nozzle row for discharging a black ink and a nozzle row for discharging color inks. Each of the nozzle rows is supplied with ink from an ink cartridge 34, and discharges ink droplets to the printing paper to print characters and/or images thereon.

In the non-print region of the carriage 3, there are provided a capping unit 35 for sealing a nozzle opening of the recording head 9 during non-printing, and a pump unit 36 having the pump motor 7 shown in FIG. 1. When the carriage 3 moves from a print region to the non-print region, the carriage 3 contacts a lever (not shown) to move the capping unit 35 upwards to seal the head 9.

When the nozzle opening row of the head 9 is clogged up or when the cartridge 34 is exchanged or the like to force the head 9 to discharge inks, the pump unit 36 is operated while the head 9 is sealed, so that inks are sucked out of the nozzle opening row by a negative pressure from the pump unit 36. Thus, dust and paper powder adhering to a portion near the nozzle opening row are cleaned. Moreover, bubbles in the recording head 9, together with inks, are discharged to a cap 37.

Then, the construction of the linear type encoder 11 mounted on the carriage 3 is shown in FIG. 3. This encoder 11 comprises a light emitting diode 11a, a collimator lens 11b, and a detection processing part 11c. The detection processing part 11c has a plurality of (four) photodiodes 11d, a signal processing circuit 11e, and two comparators $11f_A$ and $11f_B$.

If a voltage Vcc is applied between both ends of the light emitting diode 11a via a resistor, light rays are emitted from the light emitting diode 11a. The light rays are collimated by the collimator lens 11b to pass through the code plate 12. The code plate 12 is provided with slits at regular intervals (e.g., every 1/180 inches (=1/180×2.54 cm)).

The parallel rays passing through the code plate 12 are incident on each of the photodiodes 11d via a fixed slit (not shown), and converted into electric signals. The electric signals outputted from the four photodiodes 11d are processed by the signal processing circuit 11e. The signals outputted from the signal processing circuit 11e are compared by the comparators $11f_A$ and $11f_B$, and the compared results are outputted as pulses. The pulses ENC-A and ENC-B outputted from the comparators $11f_A$ and $11f_B$ are outputs of the encoder 11.

The phase of the pulse ENC-A is different from the phase of the pulse ENC-B by 90 degrees. The encoder 4 is designed so that the phase of the pulse ENC-A is advanced from the pulse ENC-B by 90 degrees as shown in FIG. 4A when the CR motor 4 is normally rotating, i.e., when the carriage 3 is moving a main scanning direction, and so that the phase of the pulse ENC-A lags behind the pulse ENC-B by 90 degrees as shown in FIG. 4B when the CR motor 4 is reversely rotating. One period T of the pulses corresponds to the distance between adjacent slits of the code plate 12 (e.g., 1/180 inches (=1/180×2.54 cm)). This is equal to a period of time, in which the carriage 3 moves between the adjacent slits.

On the other hand, the rotary type encoder 13 for the PF motor 1 has the same construction as that of the linear type encoder 11, except that the code plate is a rotating disk which rotates in accordance with the rotation of the PF motor 1. The rotary type encoder 13 is designed to output the two output pulses ENC-A and ENC-B. Furthermore, in the ink jet printer, the distance between adjacent slits of the plurality of slits provided in the code plate of the encoder 13 for the PF motor is 1/180 inches (=1/180×2.54 cm). When the PF motor 1 rotates by the distance between adjacent slits, the paper is fed by 1/1440 inches (=1/1440×2.54 cm).

Referring to FIG. 5, the position of the paper detecting sensor 15 shown in FIG. 1 will be described below.

In FIG. 5, the paper 50 inserted into a paper feeding port 61 of a printer 60 is fed into the printer 60 by means of a paper feeding roller 64 which is driven by a paper feeding motor 63. The front edge of the paper 50, which has been fed into the printer 60, is detected by, e.g., an optical paper detecting sensor 15. The paper 50, the front edge of which has been detected by the paper detecting sensor 15, is fed by means of a paper feed roller 65 and a driven roller 66 which are driven by the PF motor 1.

Subsequently, ink drops from the recording head (not shown), which is fixed to the carriage 3 moving along the carriage guide member 32, to carry out a print. Then, when the paper is fed to a predetermined position, the rear edge of the paper 50, which is currently being printed, is detected by the paper detecting sensor 15. Then, a gear 67c is driven, via a gear 67b, by means of a gear 67a which is driven by the PF motor 1. Thus, a paper discharging roller 68 and a driven roller 69 are rotated to discharge the printed paper 50 from a paper discharging port 62 to the outside.

Referring to FIGS. 6 and 7, the control of the PF motor 1 of this conventional ink jet printer will be described below.

The control of the PF motor 1 is carried out by the DC unit 6. The DC unit 6 comprises a position counter 6a, a subtracting part 6b, a target speed calculating part 6c, a speed calculating part 6d, a subtracter 6e, a proportional element 6f, an integrating element 6g, a differentiating element 6h, an adder 6i, a D/A converter 6j, a timer 6k, and an acceleration control part 6m.

The position counter 6a is designed to detect the leading and trailing edges of each of the output pulses ENC-A and ENC-B of the encoder 13 to count the number of the detected edges, and to calculate the paper feed amount of the paper, which is fed by the PF motor 1, on the basis of the counted value. In this counting, when the PF motor 1 is normally rotating, if one edge is detected, "+1" is added, and when the PF motor 1 is reversely rotating, if one edge is detected, "−1" is added. Each of the periods of the pulses ENC-A and ENC-B is equal to the distance between adjacent slits of the code plate, and the phase of the pulse ENC-A is different from the phase of the pulse ENC-B by 90 degrees. Therefore, the counted value "1" in the above described counting corresponds to 1/4 of the distance between adjacent slits of the code plate of the encoder 13. In addition, if the PF motor 1 rotates by the distance between adjacent slits, the paper is fed by 1/1440 inches (=1/1440× 2.54 cm). Therefore, when the counted value of the position counter 6a is multiplied by 1/4×1/1440 inches (=1/4×1/ 1440×2.54 cm), it is possible to obtain the paper feed amount from a position corresponding to a counted value "0", i.e., a start-up starting position. At this time, the resolution of the encoder 13 is 1/5760 inches (=1/5760×2.54 cm).

The subtracter 6b is designed to calculate a position deviation of the counted value of the position counter 6a from a target position.

The target speed calculating part 6c is designed to calculate a target speed of the PF motor 1 on the basis of the position deviation which is the output of the subtracter 6b. This calculation is carried out by multiplying the position deviation by a gain $K_p$. This gain $K_p$ is determined in accordance with the position deviation. Furthermore, the value of the gain $K_p$ may be stored in a table (not shown).

The speed calculating part 6d is designed to calculate a speed of the PF motor 1 on the basis of the output pulses ENC-A and ENC-B of the encoder 13. This speed is obtained as follows. First, the leading and trailing edges of each of the output pulses ENC-A and ENC-B of the encoder 13 are detected, and the time interval between the edges is counted by, e.g., a timer counter. Assuming that this counted value is T, the speed is in proportion to 1/T.

The subtracter 6e is designed to calculate a speed deviation of the actual speed of the PF motor 1, which is calculated by the speed calculating part 6d, from a target speed.

The proportional element 6f is designed to multiply the speed deviation by a constant Gp to output the multiplied result. The integrating element 6g is designed to integrate a value which is obtained by multiplying the speed deviation by a constant Gi. The differentiating element 6h is designed to multiply a difference between the present speed deviation and the last speed variation by a constant Gd to output the multiplied result. Furthermore, the calculations in the proportional element 6f, integrating element 6g and differentiating element 6h are carried out every one period of the output pulse ENC-A of the encoder 13, e.g., in synchronism with the leading edge of the output pulse ENC-A.

The outputs of the proportional element 6f, integrating element 6g and differentiating element 6h are added by the adder 6i. Then, the added result, i.e., the driving current of the PF motor 1, is fed to the D/A converter 6j to be converted into an analog current. On the basis of the analog current, the PF motor 1 is driven by the driver 2.

In addition, the timer 6k and the acceleration control part 6m are used for controlling acceleration, and the PID control using the proportional element 6f, integrating element 6g and differentiating element 6h is used for controlling the constant speed during deceleration and controlling deceleration.

The timer 6k is designed to generate a timer interruption signal every a predetermined time on the basis of a clock signal which is fed from the CPU 16.

The acceleration control part 6m is designed to integrate a predetermined current value (e.g., 20 mA) into a target current value every time it receives the timer interruption signal, and to feed the integrated result, i.e., the target current value of the PF motor 1 during acceleration, to the D/A converter 6j. Similar to the PID control, the target current value is converted into an analog current by the D/A converter 6j. On the basis of this analog current, the PF motor 1 is driven by the driver 2.

The driver 2 has, e.g., four transistors. By turning each of the transistors ON and OFF on the basis of the output of the D/A converter 6j, the driver 2 can be selectively in (a) an operation mode in which the PF motor 1 is normally or reversely rotated, (b) a regenerative brake operation mode (a short brake operation mode, i.e., a mode in which the stopping of the PF motor 1 is maintained), or (c) a mode in which the PF motor 1 is intended to be stopped.

Referring to FIGS. 7A and 7B, the operation of the DC unit 6 will be described below.

If a start-up command signal for starting the PF motor 1 is fed from the CPU 16 to the DC unit 6 when the PF motor 1 is stopped, a start-up initial current value $I_o$ is fed from the acceleration control part 6m to the D/A converter 6j. Furthermore, this start-up initial current value $I_o$, together with the start-up command signal, is fed from the CPU 16 to the acceleration control part 6m. Then, this current value $I_o$ is converted into an analog current by the D/A converter 6j to be fed to the driver 2, and the PF motor 1 is started up by the driver 2 (see FIGS. 7A and 7B).

After the start-up command signal is received, the timer 6k generates a timer interruption signal every a predetermined time. Every time the acceleration control part 6m receives the timer interruption signal, the acceleration control part 6m integrates a predetermined current value (e.g., 20 mA) into the start-up initial current value $I_o$, to feed the integrated current value to the D/A converter 6j. Then, the integrated current value is converted into an analog current by the D/A converter 6j to be fed to the driver 2. Then, the PF motor 1 is driven by the driver 2 so that the value of the current supplied to the PF motor 1 is the integrated current value, and the speed of the PF motor 1 increases (see FIG. 7B). Therefore, the current value supplied to the PF motor 1 is step-wise as shown in FIG. 7A.

Furthermore, at this time, although the PID control system also operates, the D/A converter 6j selects and incorporates the output of the acceleration control part 6m.

The integration of the current value in the acceleration control part 6m is carried out until the integrated current value becomes a constant current value $I_s$. When the integrated current value becomes the predetermined value $I_s$ at time $t_1$, the acceleration control part 6m stops the integration, and supplies the constant current value $I_s$ to the D/A converter 6j. Thus, the PF motor 1 is driven by the driver 2 so that the value of the current supplied to the PF motor 1 becomes the current value $I_s$ (see FIG. 7A).

Then, in order to prevent the speed of the PF motor 1 from overshooting, the acceleration control part 6m controls the PF motor 1 so as to reduce the current, which is supplied to the PF motor 1, when the speed of the PF motor 1 becomes a predetermined speed $V_1$ (time $t_2$). At this time, the speed of the PF motor 1 further increases. However, when the speed of the PF motor 1 reaches a predetermined speed $V_c$ (see time $t_3$ in FIG. 7B), the D/A converter 6j selects the output of the PID control system, i.e., the output of the adder 6i, to carry out the PID control.

That is, the target speed is calculated on the basis of the position deviation of the counted value of the counter 6a from the target position. In addition, the proportional element 6f, integrating element 6g and differentiating element 6h are operated on the basis of the speed deviation of the actual speed, which is obtained from the output of the encoder 13, from the target speed to carry out the proportional, integrating and differentiating operations. Moreover, the PF motor 1 is controlled on the basis of the sum of these calculated results. Furthermore, the above described proportional, integrating and differentiating operations are carried out in synchronism with, e.g., the leading edge of the output pulse ENC-A of the encoder 13. Thus, the speed of the PF motor 1 is controlled so as to be a desired speed $V_e$. Furthermore, the predetermined speed $V_c$ is preferably a value of 70% to 80% of the desired speed $V_e$.

The speed of the PF motor 1 is the desired speed $V_e$ after time $t_4$. Thereafter, the PF motor 1 approaches the target position (see time $t_5$ in FIG. 7B), the PF motor 1 is decelerated, and the PF motor 1 is stopped at time $t_6$.

In the conventional print control system with such a construction, the paper feed operation is carried out by the paper feed roller 65 and driven roller 66 which are driven by the PF motor 1, as described referring to FIG. 5. As shown in FIG. 8, the driven roller 66 is designed to press the paper 50 against the paper feed roller 65 by means of a spring 70 during the paper feed operation.

On the other hand, it is being required to print near the rear edge of the paper 50. To that end, it is required that the rear edge of the paper 50 is limited to a predetermined range shown in FIG. 9 by the paper feed roller 65 and the driven roller 66 (e.g., a range of 0.25 mm before and after a line drawn between the center of the paper feed roller 65 and the driven roller 66).

However, in the conventional printer, if a paper feed operation is carried out so that the rear edge of the paper 50 is positioned in a predetermined range, force F acts the paper 50 so as to send the paper 50 out by means of a spring 80 as shown in FIG. 9, since the driven roller 66 is pressed against the paper feed roller 65 by means of the spring 70. For that reason, the paper 50 is sent out between the paper feed roller 65 and the driven roller 66, or moves the driven roller 66 due to frictional force, so that there is a problem in that it is not possible to ensure the paper feed precision in the vicinity of the rear edge of the paper 50.

SUMMARY OF THE INVENTION

It is therefore an object of the present invention to eliminate the aforementioned problems and to provide a print control system, a print control method, and a recording medium in which a print program has been recorded, which are capable of ensuring the paper feed precision even in the vicinity of the rear edge of a paper.

According to the present invention, there is provided with a print control system comprising:

a position detecting part for detecting the position and traveling direction of an object to be controlled, which is controlled by a servomotor;

a speed detecting part for detecting a physical quantity corresponding to the speed of said object to be controlled;

a first control part for determining a current value or a voltage value, which is to be added to said servomotor, on the basis of the output of said position detecting part so that said object to be controlled is positioned within a target range, and for controlling said servomotor on the basis of the determined current value or the determined voltage value;

a second control part for determining a current value or a voltage value, which is added to said servomotor, on the basis of the output of each of said position detecting part and said speed detecting part so that said object to be controlled is positioned within said target range, and for controlling said servomotor on the basis of the determined current value or the determined voltage value;

a third control part for determining a current value or a voltage value of said servomotor on the basis of the output of said position detecting part so that said object to be controlled is stopped within a predetermined range, and for controlling said servomotor on the basis of the determined current value or the determined voltage value; and a control selecting part, which operates in a predetermined timing, for determining whether said object to be controlled is positioned within said target range on the basis of the output of said position detecting part, said control selecting part selecting said third control part when said object to be controlled is positioned within said target range, and selecting said first or second control part on the basis of the output of said speed detecting part when said object to be controlled is positioned out of said target range, said control selecting part causing the selected control part to control said servomotor.

According to the invention, there is also provided with a print control system comprising:

a paper rear edge holding/driving control part for driving and controlling a paper feed motor so as to hold the rear edge of a paper, which is fed by said paper feed motor, in a predetermined holding region;

a usual paper feed control part for controlling said paper feed motor so as to carry out a usual paper feed operation; and a control selecting part for selecting one of said paper rear edge holding/driving control part and said usual paper feed control part on the basis of the kind and feed amount of said paper and the presence of detection of the rear edge of said paper.

Furthermore, said paper rear edge holding/driving control part may comprise:

a position detecting part for detecting the position and traveling direction of said paper;

a speed detecting part for detecting a physical quantity corresponding to the feed speed of said paper;

a first control part for determining a current value or a voltage value, which is to be added to said paper feed motor, on the basis of the output of said position detecting part so that the rear edge of said paper is positioned within a target range, and for controlling said paper feed motor on the basis of the determined current value or the determined voltage value;

a second control part for determining a current value or a voltage value, which is to be added to said paper feed motor, on the basis of the output of each of said position detecting part and said speed detecting part so that the rear edge of said paper is positioned within said target range, and for controlling said paper feed motor on the basis of the determined current value or the determined voltage value;

a third control part for determining a current value or a voltage value of said paper feed motor on the basis of the output of said position detecting part so that the rear edge of said paper is stopped within a predetermined range, and for controlling said paper feed motor on the basis of the determined current value or the determined voltage value; and a second control selecting part, which operates in a predetermined timing, for determining whether the rear edge of said paper is positioned within said target range on the basis of the output of said position detecting part, said second control selecting part selecting said third control part when the rear edge of said paper is positioned within said target range, and selecting said first or second control part on the basis of the output of said speed detecting part when the rear edge of said paper is positioned out of said target range, said second control selecting part causing the selected control part to control said paper feed motor.

Furthermore, said paper rear edge holding/driving control part may further comprise a differential control part, which is called to operate when each of said first through third control parts operates, for deriving a speed deviation of a feed speed of said paper during each operation from a reference speed and for calculating a current value or a voltage value which is in proportion to the difference between a speed deviation during the present operation and a speed deviation during the last operation.

Furthermore, said paper rear edge holding/driving control part may further comprise a differential control part, which is called to operate when each of said first through third control parts operates, for deriving a speed deviation of a feed speed of said paper during each operation from a reference speed and for calculating a current value or a voltage value which is obtained by multiplying the difference between a speed deviation during the present operation and a speed deviation during the last operation by a constant corresponding to said speed deviation.

Furthermore, said position detecting part may detect leading and trailing edges of an output pulse of an encoder which generates an output pulse in accordance with the rotation of said paper feed motor, said position detecting part having a counter which counts up the detected edges when said paper feed motor is normally rotating, and counts down the detected edges when said paper feed motor is reversely rotating, said position detecting part outputting a pulse in synchronism with said leading and trailing edges.

Furthermore, said second control selecting part may have a timer counter in which a counted value is reset when the counted value reaches a set value or when a pulse is received from said position detecting part, said second control selecting part selecting said first control part when no pulse is received from said position detecting part even if the counted value of said timer counter reaches said set value in a case where the rear edge of said paper is positioned out of said target range, and said second control selecting part selecting said second control part when a pulse is received from said position detecting part before the counted value of said timer counter reaches said set value in a case where the rear edge of said paper is positioned out of said target range.

Furthermore, when said first control part is selected by said second control selecting part, if the position of the rear edge of said paper has not exceeded said target position or if the position of the rear edge of said paper has exceeded said target position and also has exceeded said target range, said first control part may add or subtract a predetermined change current value or a predetermined change voltage value to or from a current value or a voltage value which is currently applied to said paper feed motor, and control said paper feed motor on the basis of the calculated result, and if the position of the rear edge of said paper is within said target range, said first control part may control said paper feed motor on the basis of a current value or a voltage value which is applied to said paper feed motor.

Furthermore, when said second control part is selected by said second control selecting part, if the position of the rear edge of said paper has not exceeded said target position or if the position of the rear edge of said paper has exceeded said target position and also has exceeded said target range, said second control part may compare the output of said speed detecting part with a threshold to select a predetermined change current value or a predetermined change voltage value on the basis of the compared result to calculate a current value or a voltage value, which is to be applied to said paper feed motor, on the basis of the selected change current value or the selected change voltage value and a current value or a voltage value, which is currently applied to said paper feed motor, so that the rear edge of said paper is positioned within said target range, and control said paper feed motor on the basis of the calculated current value or the calculated voltage value, and if the position of the rear edge of said paper is within said target range, said second control part may subtract a predetermined current value or a predetermined voltage value from a current value or a voltage value, which is applied to said paper feed motor, in the opposite direction to a current value or a voltage value in the traveling direction of said paper, and control said paper feed motor on the basis of the subtracted result.

Furthermore, said speed detecting part may have time measuring part for detecting leading and trailing edges of an output pulse of said encoder, and for measuring a time between adjacent edges, said speed detecting part outputting the measured result.

Furthermore, when said third control part is selected by said second control selecting part, said third control part may determine whether the rear edge of said paper is positioned within a predetermined allowable range including said target range, said third control part operating said first or second control part via said second control selecting part when the edge of said paper is positioned out of said predetermined allowable range.

According to the present invention, there is provided with a print control method for use in a print system comprising:

a position counter having a counter for detecting leading and trailing edges of an output pulse of an encoder which operates integrally with a paper fed by a paper feed motor, and for counting so as to count up the detected edges when said paper feed motor is normally rotating and so as to count down the detected edges when said paper feed motor is reversely rotating, said position counter outputting a pulse in synchronism with said leading and trailing edges;

a period counter for detecting leading and trailing edges of an output pulse of said encoder and for measuring a time between adjacent edges; and a timer counter having a set value, the counted value of said timer counter being reset when the counted value reaches said set value or when said timer counter receives a pulse from said position counter, said print control method comprising the steps of:

comparing the counted value of said position counter with a target position of the rear edge of said paper when a pulse is received from said position counter or when the counted value of said timer counter reaches said set value;

carrying out a hold control so that the rear edge of said paper is stopped within an allowable range including a target range including said target position, on the basis of the output of said position counter and a control parameter when the position of the rear edge of said paper is within said target range;

carrying out a timer interruption control so that the rear edge of said paper is positioned within said target range, on the basis of the output of said position counter when no pulse is received from said position counter even if the counted value of said timer counter reaches said set value in a case where the position of the rear edge of said paper is out of said target range; and carrying out an encoder interruption control so that the position of the rear edge of said paper is within said target range, on the basis of the output of said position counter and the output of said period counter when a pulse is received from said position counter before the counted value of said timer counter reaches said set value in a case where the rear edge of said paper is not within said target range.

Furthermore, said step of carrying out the timer interruption control may comprise the steps of:

adding or subtracting said change current value or said change voltage value to or from a current value or a voltage value, which is currently applied to said paper feed motor, when the position of the rear edge of said paper has not exceed said target position or when the position of the rear edge of said paper has exceeded said target position and also has exceeded said target range, and controlling said paper feed motor on the basis of the calculated result; and controlling said paper feed motor on the basis of a current value or a voltage value, which is applied to said paper feed motor, when the position of the rear edge of said paper is within said target range.

Furthermore, said step of carrying out the encoder interruption control may comprise the steps of:

comparing the output of said period counter with a threshold to select a predetermined change current value or a predetermined change voltage value on the basis of the compared result to calculate a current value or a voltage value, which is to be applied to said paper feed motor, on the basis of the selected change current value or the selected change voltage value and a current value or a voltage value, which is currently applied to said paper feed motor, so that the rear edge of said paper is positioned within said target range, and controlling said paper feed motor on the basis of the calculated current value or the calculated voltage value, if the position of the rear edge of said paper has not exceeded said target position or if the position of the rear edge of said paper has exceeded said target position and also has exceeded said target range; and subtracting a predetermined current value or a predetermined voltage value from a current value or a voltage value, which is applied to said paper feed motor, in the opposite direction to a current value or a voltage value in the traveling direction of said paper, and controlling said paper feed motor on the basis of the subtracted result, if the position of the rear edge of said paper is within said target range.

Furthermore, said step of carrying out the hold control may include a step of determining whether the position of the rear edge of said paper is within a predetermined allowable range including said target range, and operating said timer interruption control or said encoder interruption control when the position of the rear edge of said paper is not within said allowable range.

According to the present invention, there is provided with a recording medium in which a print control program for controlling a print by means of a computer has been recorded, said print control program comprising:

the procedure for comparing the counted value of a position counter for detecting the present position and the traveling direction of a paper with the position of the rear edge of said paper when a pulse is received from said position counter or when the counted value of a timer counter reaches a set value;

the procedure for carrying out a hold control so that the rear edge of said paper is stopped within an allowable range including a target range including said target position, on the basis of the output of said position counter when the position of the rear edge of said paper is within said target range;

the procedure for carrying out a timer interruption control so that the rear edge of said paper is positioned within said target range, on the basis of the output of said position counter when no pulse is received from said position counter even if the counted value of said timer counter reaches said set value in a case where the position of the rear edge of said paper is not within said target range; and the procedure for carrying out an encoder interruption control so that the position of the rear edge of said paper is within said target range, on the basis of the output of said position counter and the output of a period counter for detecting leading and trailing edges of an output pulse of an encoder and for measuring a time between adjacent edges, when a pulse is received from said position counter before the counted value of said timer counter reaches said set value in a case where the rear edge of said paper is not within said target range.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, particularly to FIGS. 10 through 24, the construction of a preferred embodiment of a print control system according to the present invention will be described below.

Figure 1:
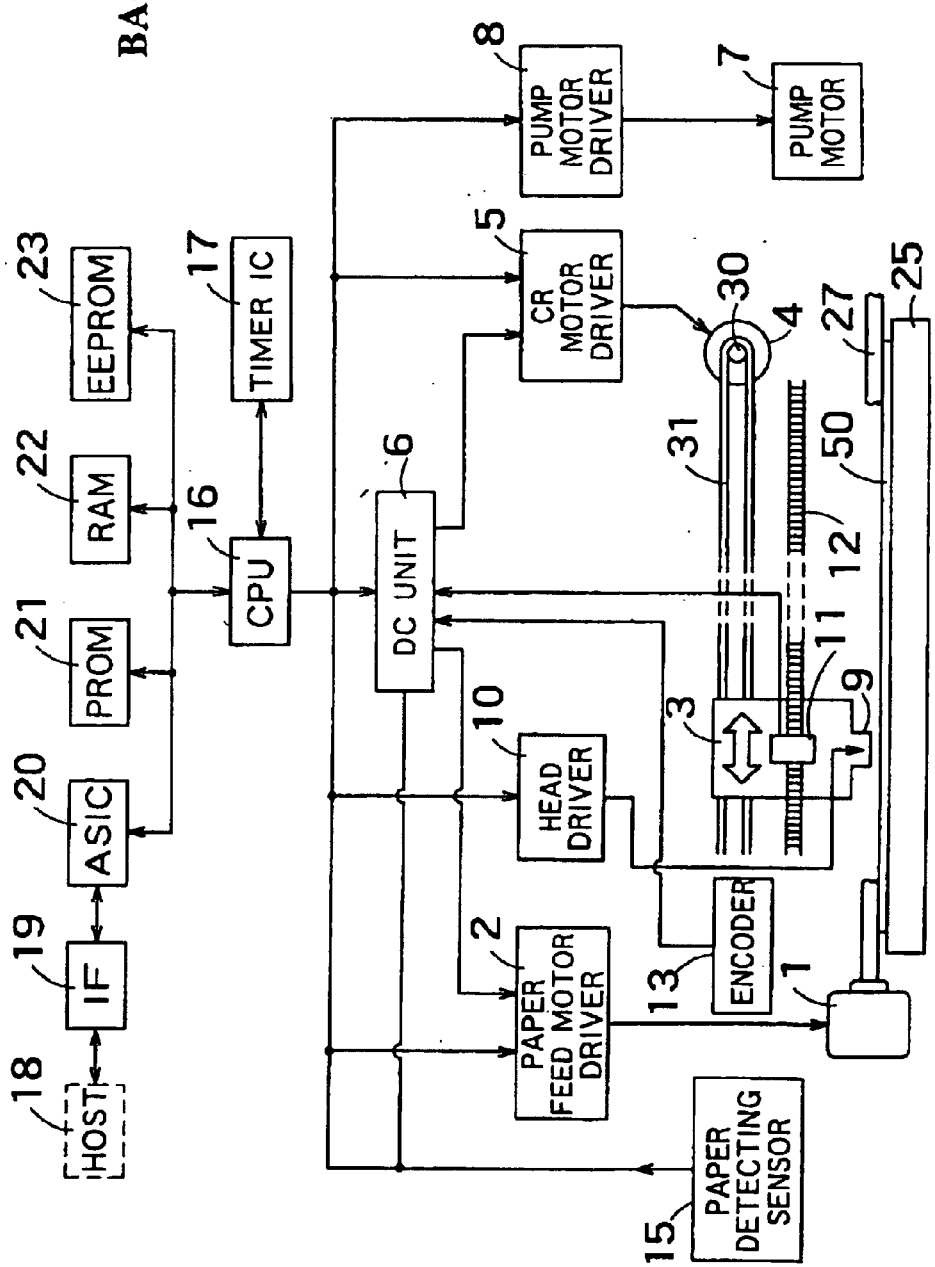
FIG. 1 is a block diagram showing the schematic construction of an ink jet printer.
Figure 2:
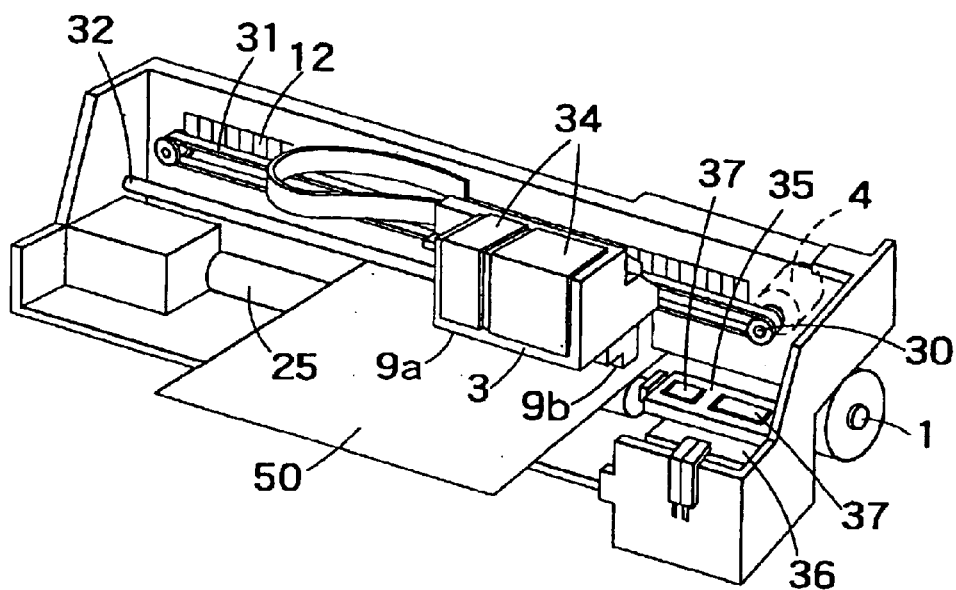
FIG. 2 is a perspective view showing the peripheral construction of a carriage.
Figure 3:
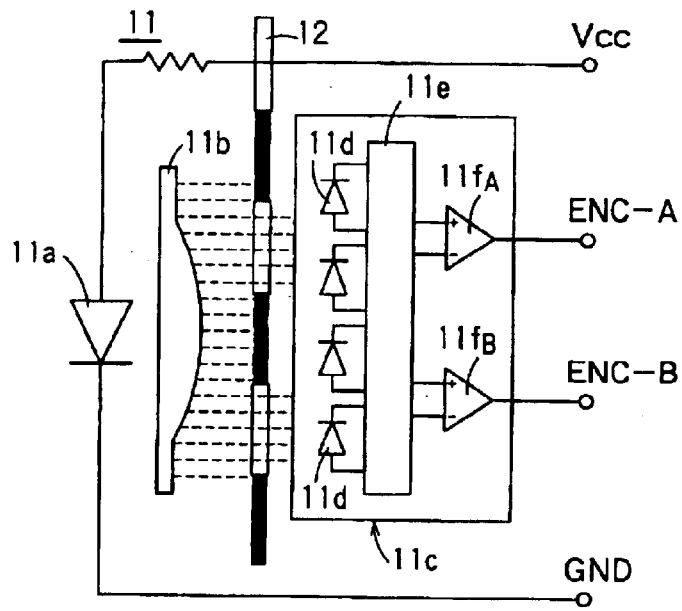
FIG. 3 is a schematic diagram showing the construction of a linear type encoder.
Figure 4A:
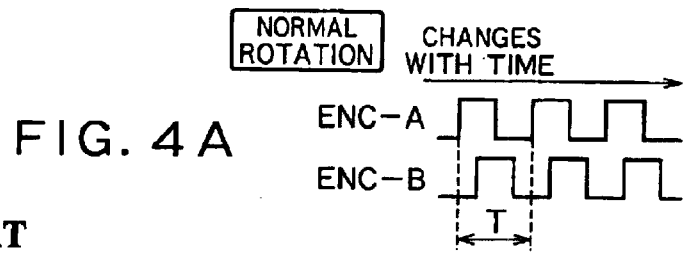
FIGS. 4A and 4B are waveform illustrations of output pulses of an encoder.
Figure 4B:
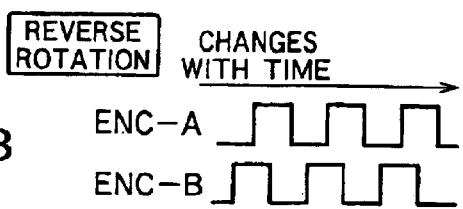
Figure 5:
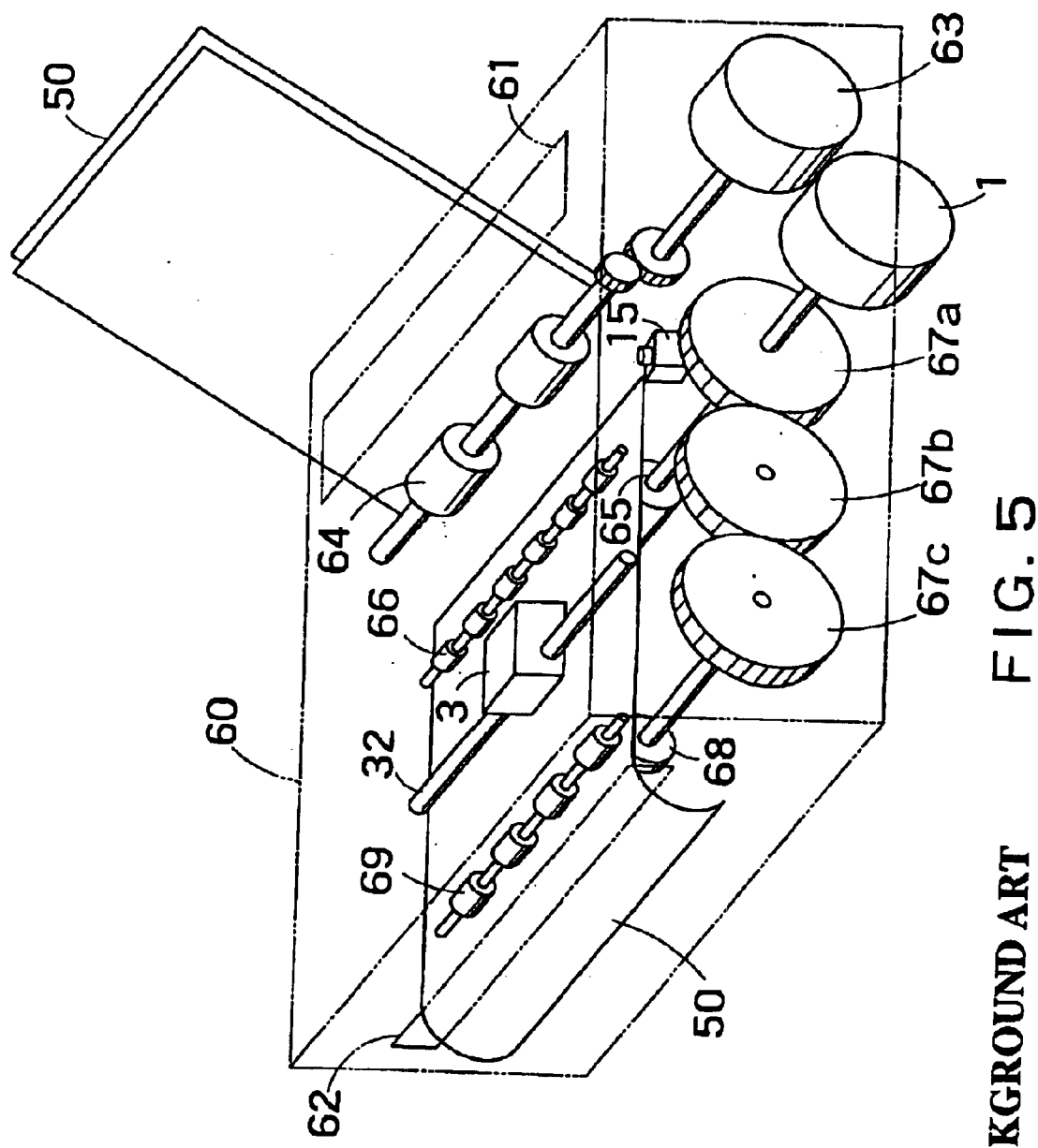
FIG. 5 is a schematic perspective view of a printer for explaining the position of a paper detecting sensor.
Figure 6:
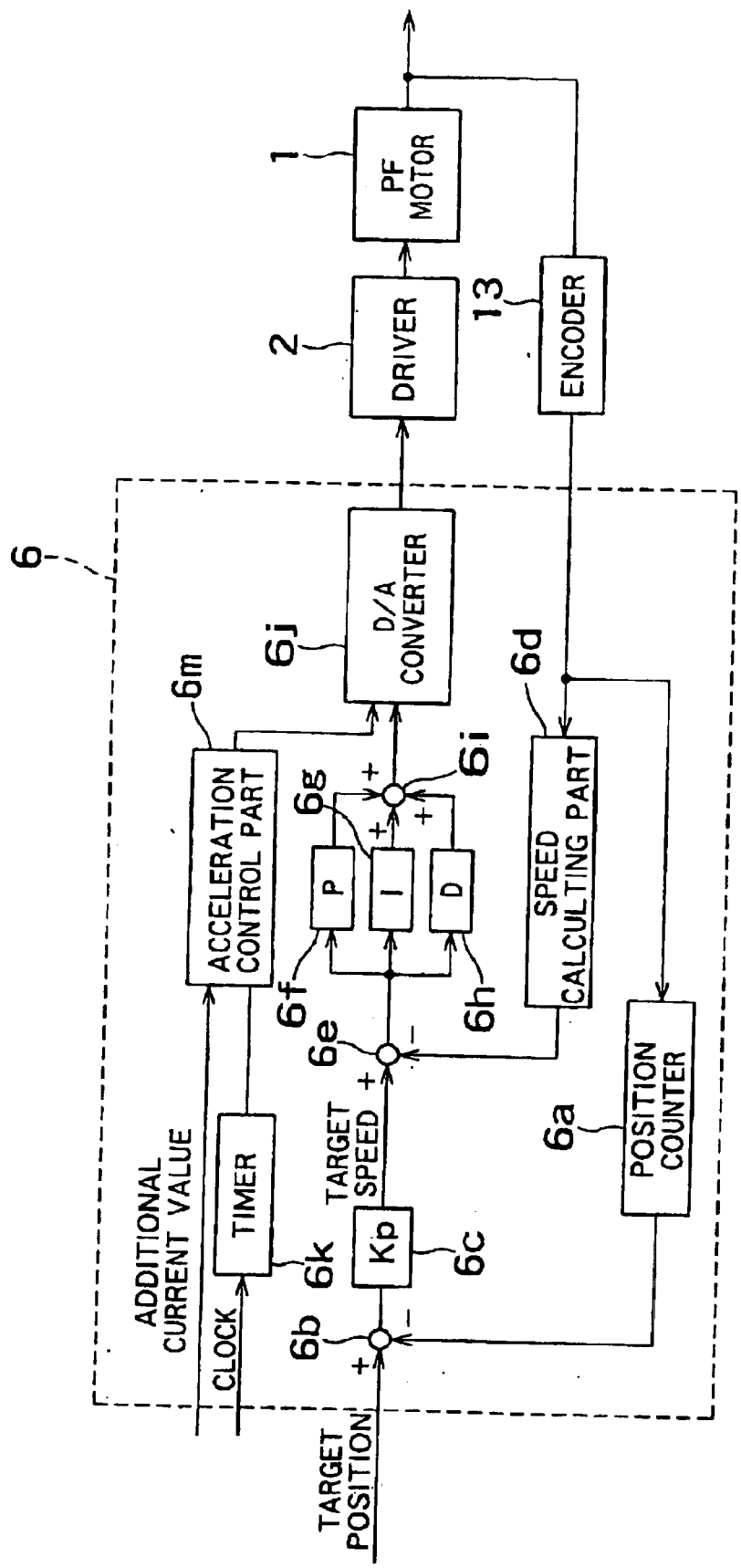
FIG. 6 is a block diagram showing the construction of a conventional print control system.
Figure 7:
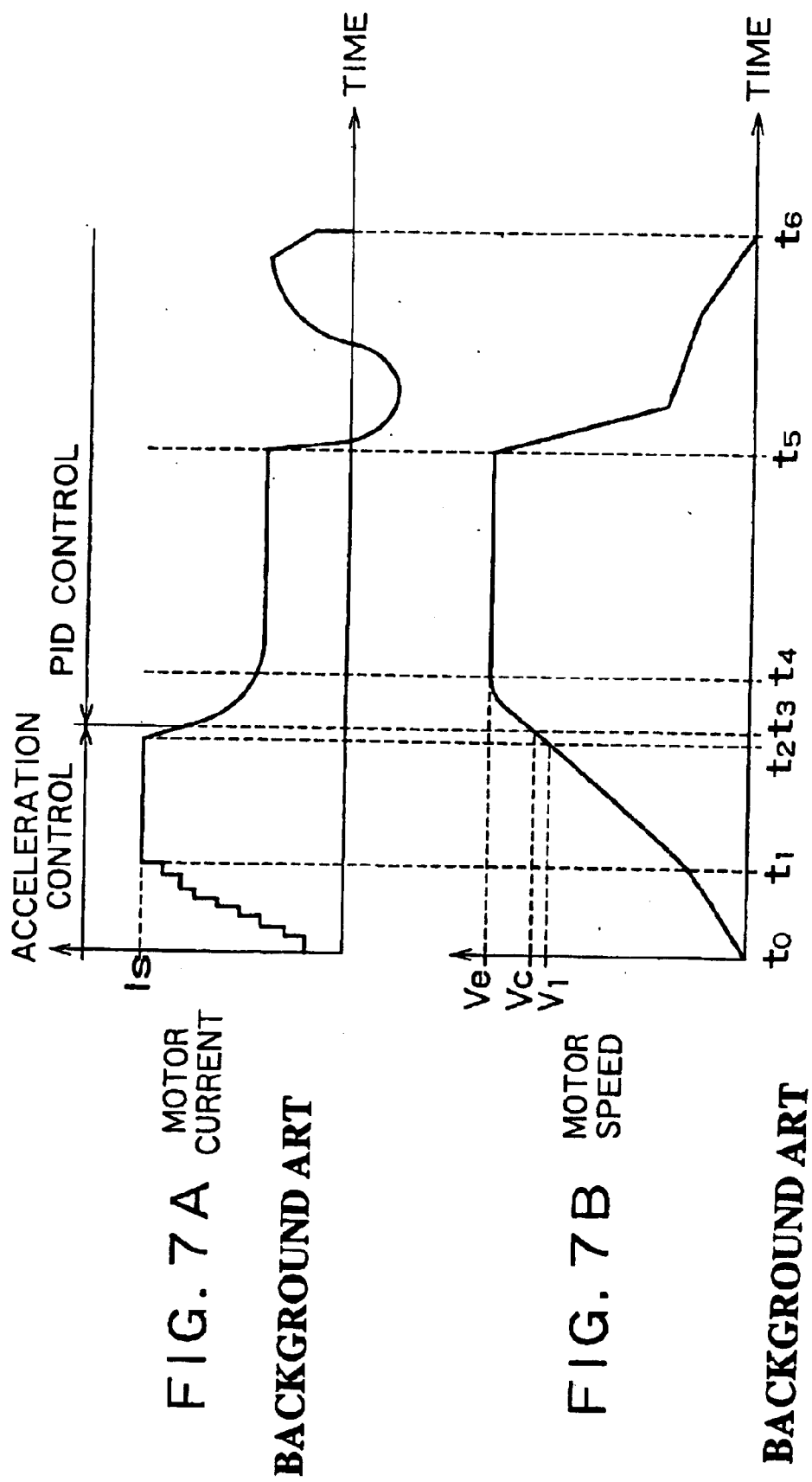
FIGS. 7A and 7B are timing charts for explaining a paper feed control in a conventional print control system.
Figure 8:
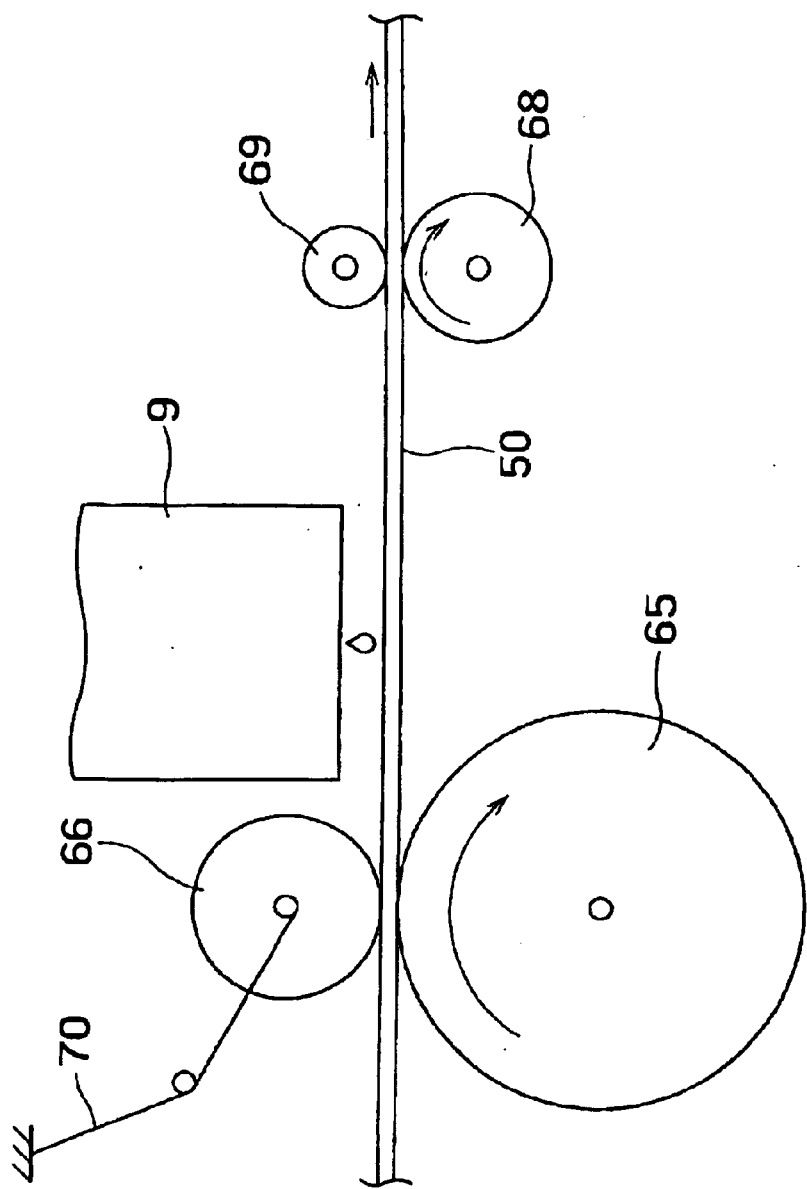
FIG. 8 is an illustration for explaining a paper feed mechanism.
Figure 10:
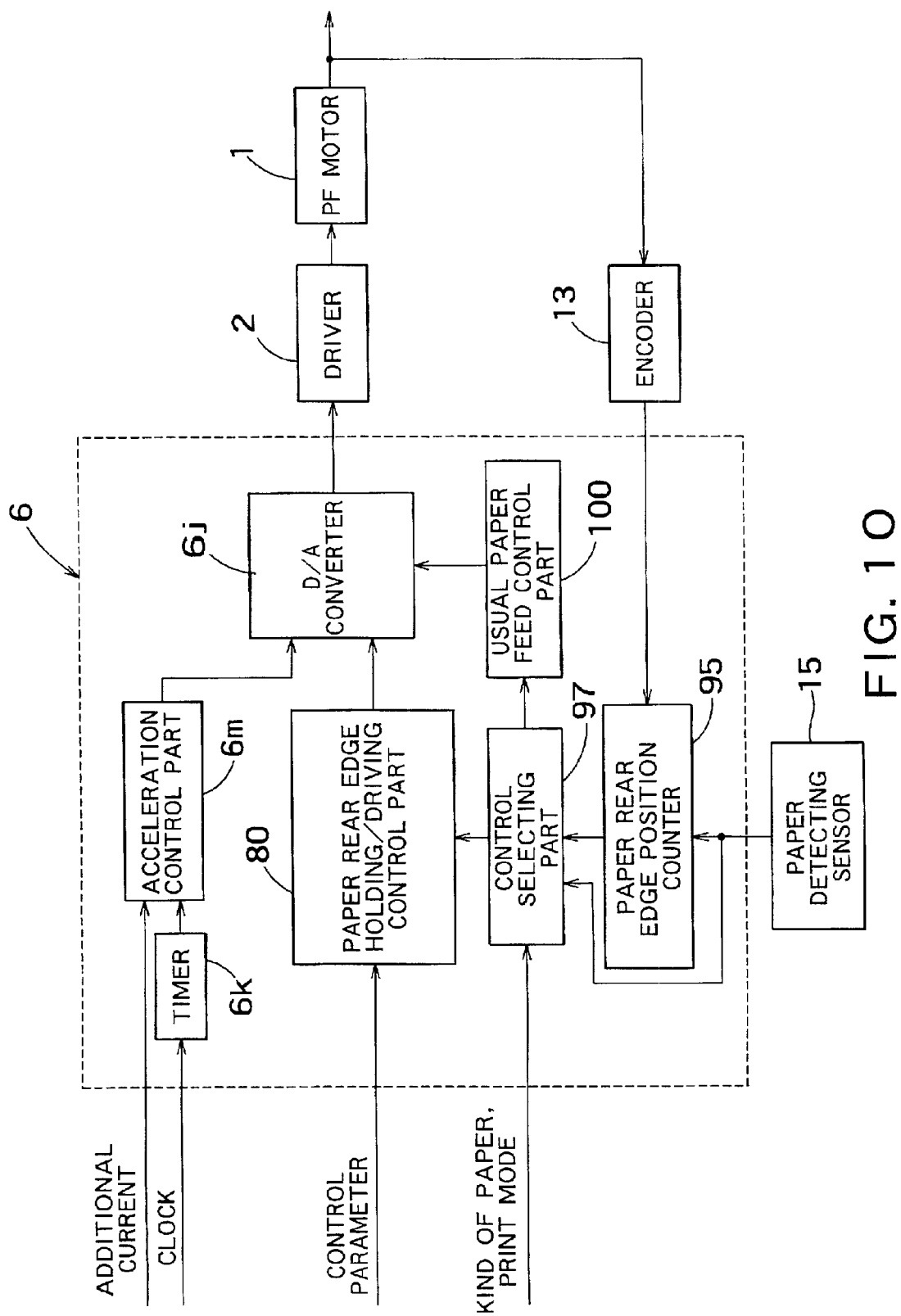
FIG. 10 is a block diagram of a preferred embodiment of a print control system according to the present invention.

The construction of a print control system in this preferred embodiment is shown in FIG. 10. The print control system in this preferred embodiment further comprises a paper rear edge holding/driving control part 80, a paper rear edge position counter 95 and a control selecting part 97, in addition to the conventional print control system 6 shown in FIG. 6. Furthermore, a usual paper feed control part 100 shown in FIG. 10 comprises the position counter 6a, the subtracter 6b, the target speed calculating part 6c, the speed calculating part 6d, the subtracter 6e, the proportional element 6f, the integrating element 6g, the differentiating element 6h and the adder 6i, which are provided in the conventional print control system 6 shown in FIG. 6. That is, the usual paper feed control part 100 comprises the elements provided in the conventional print control system 6 shown in FIG. 6, except for the D/A converter 6j, the timer 6k and the acceleration control part 6m.

Figure 11:
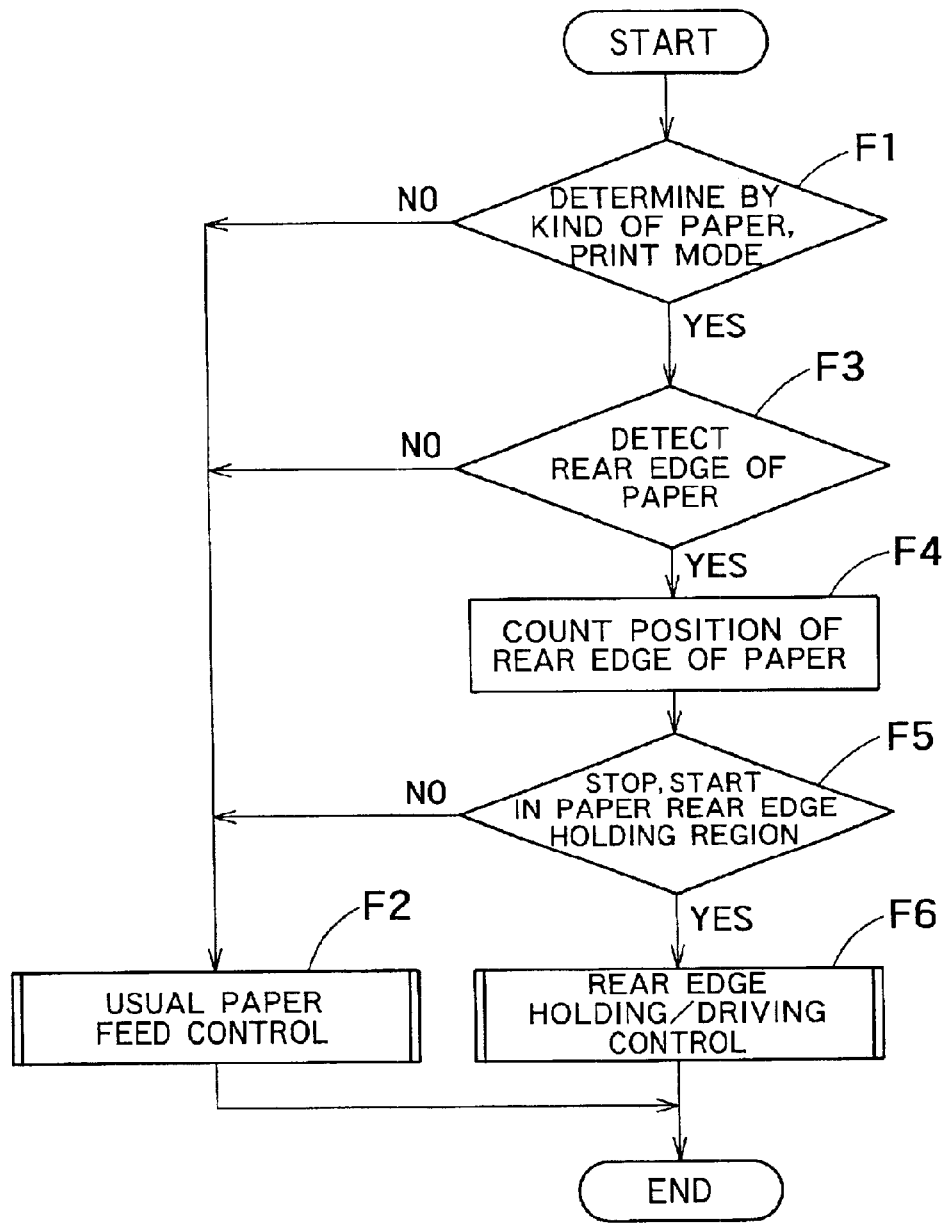
FIG. 11 is a flow chart for explaining the schematic operation of a print control system according to the present invention.

Referring to FIG. 11, the operation of the print control system in this preferred embodiment will be described below.

First, on the basis of a start-up command, the PF motor 1 is started by the acceleration control part 6m to start a paper feed operation. At this time, the control selecting part 97 determines the kind of a paper and a print mode (see step F1 in FIG. 11), and in the case of kinds of paper and modes other than the specific kinds of paper and the specific print modes, the control selecting part 97 selects the usual paper feed control part 100 (see step F2 in FIG. 11), so that the same paper feed operation as the conventional case is carried out.

In the case of the specific kind of paper (e.g., a thick paper), the routine goes to step F3 wherein it is determined whether the rear edge of the paper has been detected by the paper detecting sensor 15. If it is determined that the rear edge of the paper has not been detected, the control selecting part 97 selects the usual paper feed control part 100 (see step F2 in FIG. 11), so that the same paper feed operation as the conventional case is carried out.

Figure 9:
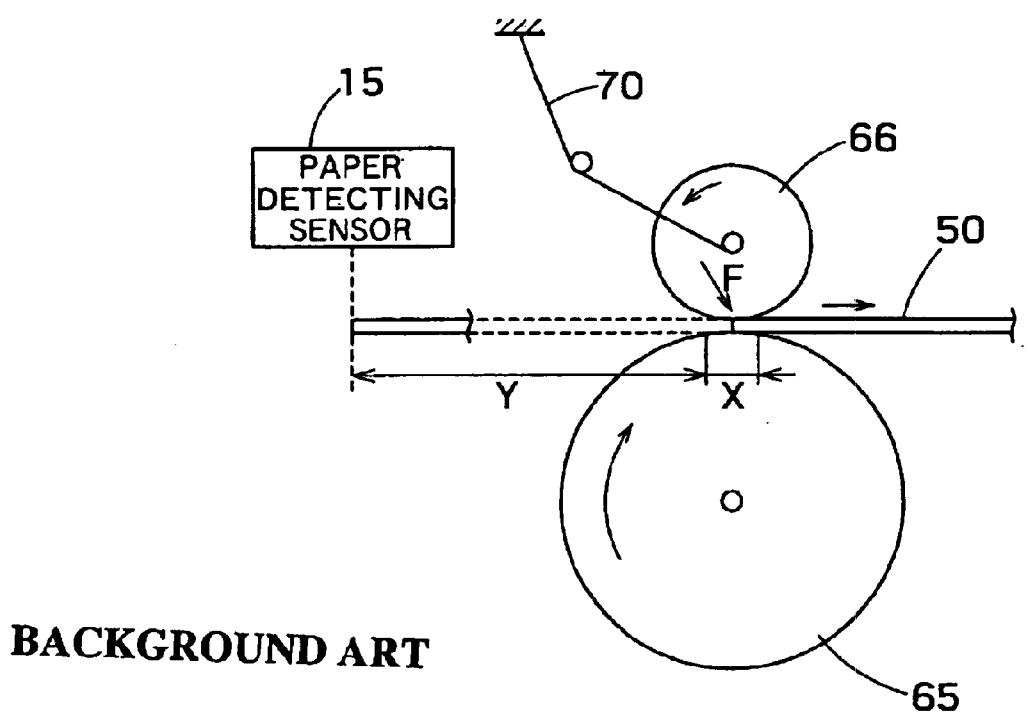
FIG. 9 is an illustration for explaining conventional problems.

If it is determined at step F3 that the rear edge of the paper has been detected, the present position of the rear edge of the paper is counted by the paper rear edge position counter 95 on the basis of the output of the encoder 13 (see step F4 in FIG. 11). Then, on the basis of the counted value and a target value of a paper feed amount, the control selecting part 97 determines whether the rear edge of the paper is stopped in a paper rear edge holding region after the present paper feed control is completed (see step F5 in FIG. 11). Furthermore, the paper rear edge holding region means a region X shown in FIG. 9.

If it is determined at step F5 that the rear edge of the paper is not stopped in the paper rear edge holding region, the control selecting part 97 selects the usual paper feed control part 100 (see step F2 in FIG. 11), so that the same paper feed operation as the conventional case is carried out.

If it is determined at step F5 that the rear edge of the paper is stopped in the paper rear edge holding region, the control selecting part 97 selects the paper rear edge holding/driving control part 80 to carry out a paper rear edge holding/driving control (see step F6). Therefore, when the rear edge of the paper is stopped in a region Y shown in FIG. 9, i.e., a region Y from the position of the paper detecting sensor 15 to the paper rear edge holding region X, or when the rear edge of the paper passes through the paper rear edge holding region X, the paper rear edge holding/driving control part 80 is not selected. Furthermore, the paper rear edge holding/driving control part 80 is also selected by the control selecting part 97 when the rear edge of the paper is started from the paper rear edge holding region.

Figure 12:
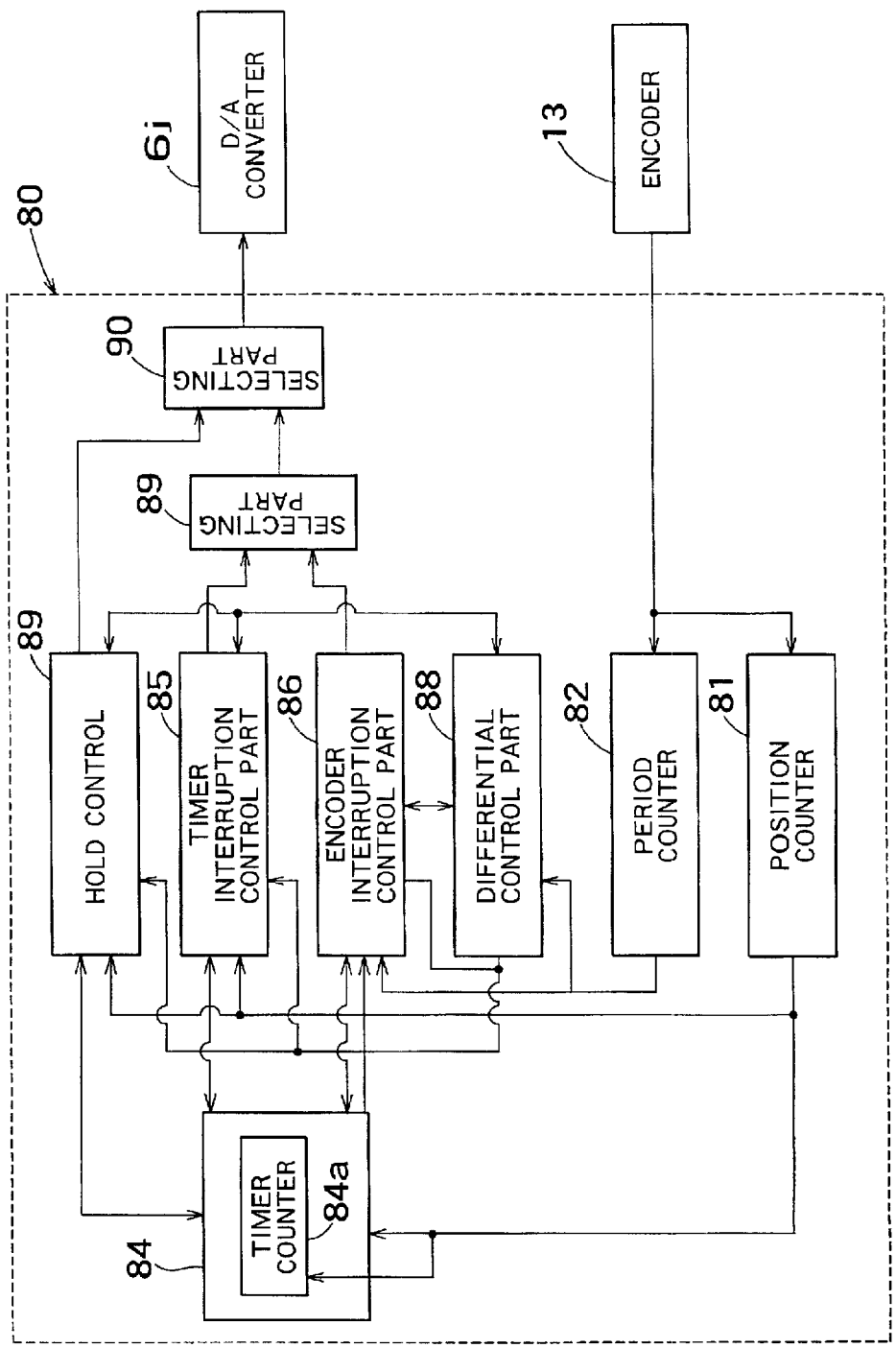
FIG. 12 is a block diagram of an example of a paper rear edge holding/driving control part according to the present invention.
Figure 13:
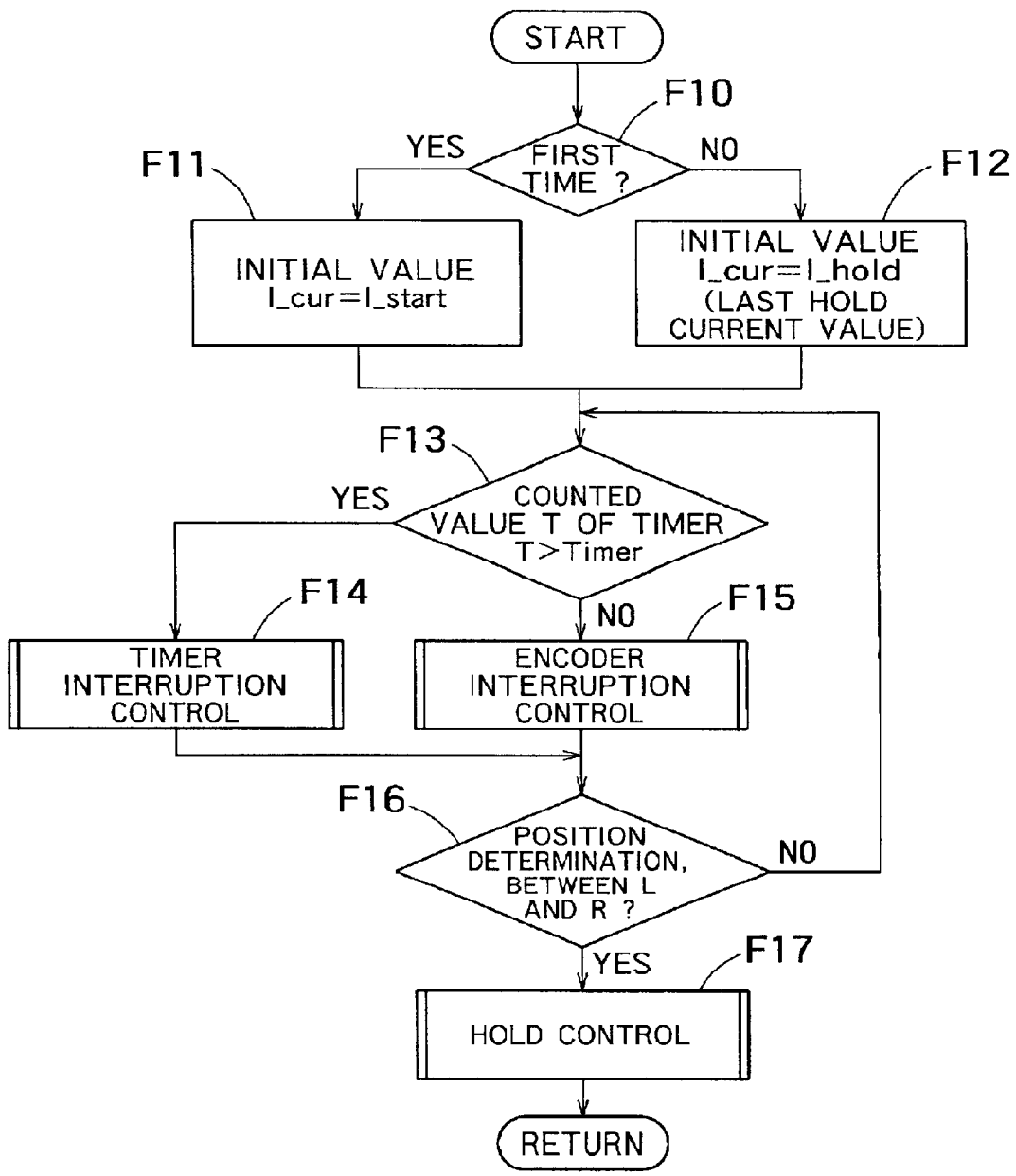
FIG. 13 is a flow chart for explaining the operation of a paper rear edge holding/driving control part according to the present invention.

Referring to FIGS. 12 through 24, the construction and operation of the paper rear edge holding/driving control part 80 will be described below. The construction of the paper rear edge holding/driving control part 80 is shown in FIG. 12, and its operation is shown in FIG. 13.

The paper rear edge holding/driving control part 80 comprises a position counter 81, a period counter 82, a control selecting part 84, a timer interruption control part 85, an encoder interruption control part 86, a hold control part 87, a differential control part 88, and selecting parts 89 and 90. This paper rear edge holding/driving control part is used for controlling the rear edge of the paper so that the rear edge of the paper is held in the paper rear edge holding region.

The position counter 81 is designed to detect the leading and trailing edges of each of the output pulses ENC-A and ENC-B of the encoder 13 to count the number of the detected edges to output a pulse in synchronism with the leading and trailing edges. In this counting, when the PF motor 1 is normally rotating, if one edge is detected, "+1" is added, and when the PF motor 1 is reversely rotating, if one edge is detected, "−1" is added.

The period counter 82 is designed to detect the leading and trailing edges of each of the output pulses ENC-A and ENC-B of the encoder 13 to count a time (period), which is required for the paper to move 1/4 of the distance between adjacent slits of the code plate 12, by, e.g., a timer counter, to output a counted value T-cur.

The control selecting part 84 has a timer counter 84a having a set value Timer. This timer counter 84a starts a count in response to a selection signal from the control selecting part 97, and carry out the count until the counted value reaches the set value Timer. When the counted value reaches the set value Timer or when the timer counter 84a receives an output pulse from the position counter, the timer counter 84a is reset to start a count from zero again.

Figure 14:
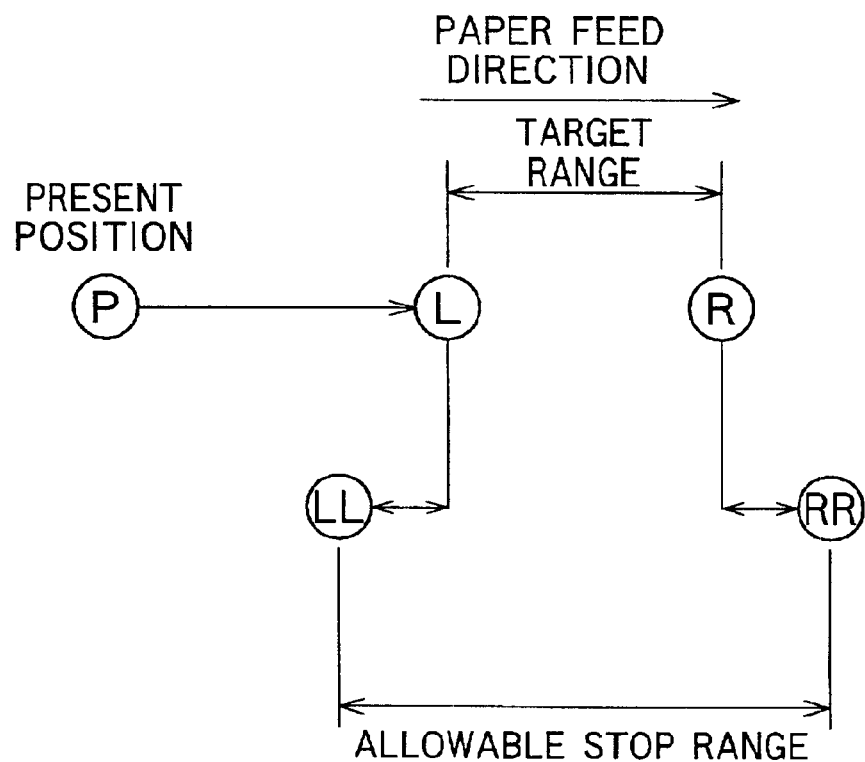
FIG. 14 is a schematic diagram for explaining a paper feed target range for use in the present invention.

In addition, when the control selecting part 84 receives an output pulse from the position counter 81, if the rear edge of the paper is positioned in a target range including the target position as shown in FIG. 14, the control selecting part 84 selects the hold control part 87. If the rear edge of the paper is positioned beyond the target range, the control selecting part 84 selects the timer interruption control part 85 or the encoder interruption control part 86 on the basis of a counted value T when the timer counter 84a receives the output pulse from the position counter 81. Even if the counter value T reaches the set value Timer, if the timer counter 84a does not receive the output pulse from the position counter 81 (it is regarded as T>Timer in this case), i.e., if the paper 50 is stopped or is far more slowly moving than the target speed, the control selecting part 84 selects the timer interruption control part 85. If the counted value T is the set value Timer or less, the control selecting part 84 selects the encoder interruption control part 86. Therefore, the control selecting part 84 carries out the operation for selecting one selecting part of the above described three control parts, every time the control selecting part 84 receives an output pulse from the position counter 81 or when the counted value of the timer counter 84a reaches the set value Timer.

When the timer interruption control part 85 is selected by the control selecting part 84, the timer interruption control part 85 determines a current I-cur, which is to be added to the PF motor 1, on the basis of the position and traveling direction of the rear edge of the paper, which are obtained from the output of the position counter 81, to output the determined current I-cur to the selecting part 89.

When the encoder interruption control part 86 is selected by the control selecting part 84, the encoder interruption control part 86 determines a current I-cur, which is to be added to the PF motor 1, on the basis of the position and traveling direction of the rear edge of the paper, which are obtained from the output of the position counter 81, and the period T-cur which is obtained from the output of the period counter 82, to output the determined current I-cur to the selecting part 89.

When the timer interruption control part 85 is selected, the selecting part 89 selects the output of the timer interruption control part 85 to transmit the selected output to the selecting part 90, and when the encoder interruption control part 86 is selected, the selecting part 89 selects the output of the encoder interruption control part 86 to transmit the selected output to the selecting part 90.

The differential control part 88 is designed to calculate a speed deviation of the present speed of the rear edge of the paper from a reference speed, on the basis of the period T-cur which is obtained from the output of the period counter 82, and to determine a change current value I-crtD according to the difference between the calculated speed deviation and a speed deviation during the last interruption, i.e., during the last operation. Furthermore, the change current value IcrtD may be obtained by multiplying the difference between the speed deviation of the present speed of the rear edge of the paper from the reference speed and the speed deviation during the last operation, by a constant corresponding to the calculated speed deviation.

On the basis of the position and traveling direction of the rear edge of the paper which are obtained from the output of the position counter 81, the hold control part 87 determines a current I-cur, which is to be added to the PF motor 1, so as to hold the position of the rear edge of the paper in an allowable range during hold shown in FIG. 14 when the rear edge of the paper is positioned in the above described allowable range, and the hold control part 87 operates the timer interruption control part 85 or the encoder interruption control part 86 via the control selecting part 84 when the rear edge of the paper is positioned beyond the above described allowable range.

When the hold control part 87 is selected, the selecting part 90 selects the output of the hold control part 87 to transmit the selected current I-cur, which is to be added to the PF motor 1, to the D/A converter 6j, and when the hold control part 87 is not selected, the selecting part 90 selects the output of the selecting part 89 to transmit the selected current I-cur, which is to be added to the PF motor 1, to the D/A converter 6j. This current I-cur is converted into an analog current by the D/A converter 6j, and the PF motor 1 is driven by the driver 2 on the basis of the analog current.

Referring to FIG. 13, the schematic operation of the paper rear edge holding/driving control part 80 will be described below.

First, if the paper rear edge holding/driving control part 80 is selected, the control selecting part 84 determines whether the selection is carried out for the first time or for the second time or more (see step F10). In the case of the first time, I-cur=I-start is set as the initial value of the current value I-cur (see step F11). In the case of the second time or more, the last hold current value I-hold is set as I-cur=I-hold as the initial value of the current value I-cur (see step F12).

Subsequently, it is determined whether the counted value T of the timer counter 84a is Timer (see step F13). When T>Timer, the timer interruption control part 85 is selected by the control selecting part 84, so that a timer interruption control is executed (see step F14). When T≦Timer, the encoder interruption control part 86 is selected by the control selecting part 84 (see step F15), so that an encoder interruption control is carried out.

Then, on the basis of the output of the position counter 81, the control selecting part 84 determines whether the present position of the rear edge of the paper is positioned in the target range LR shown in FIG. 14 (see step F16). When the rear edge of the paper is not positioned in the target range LR, the routine returns to step F13 to repeat the above described steps.

When the rear edge of the paper is positioned in the target range LR, the hold control part 87 is selected by the control selecting part 84, so that a hold control is carried out.

Figure 15:
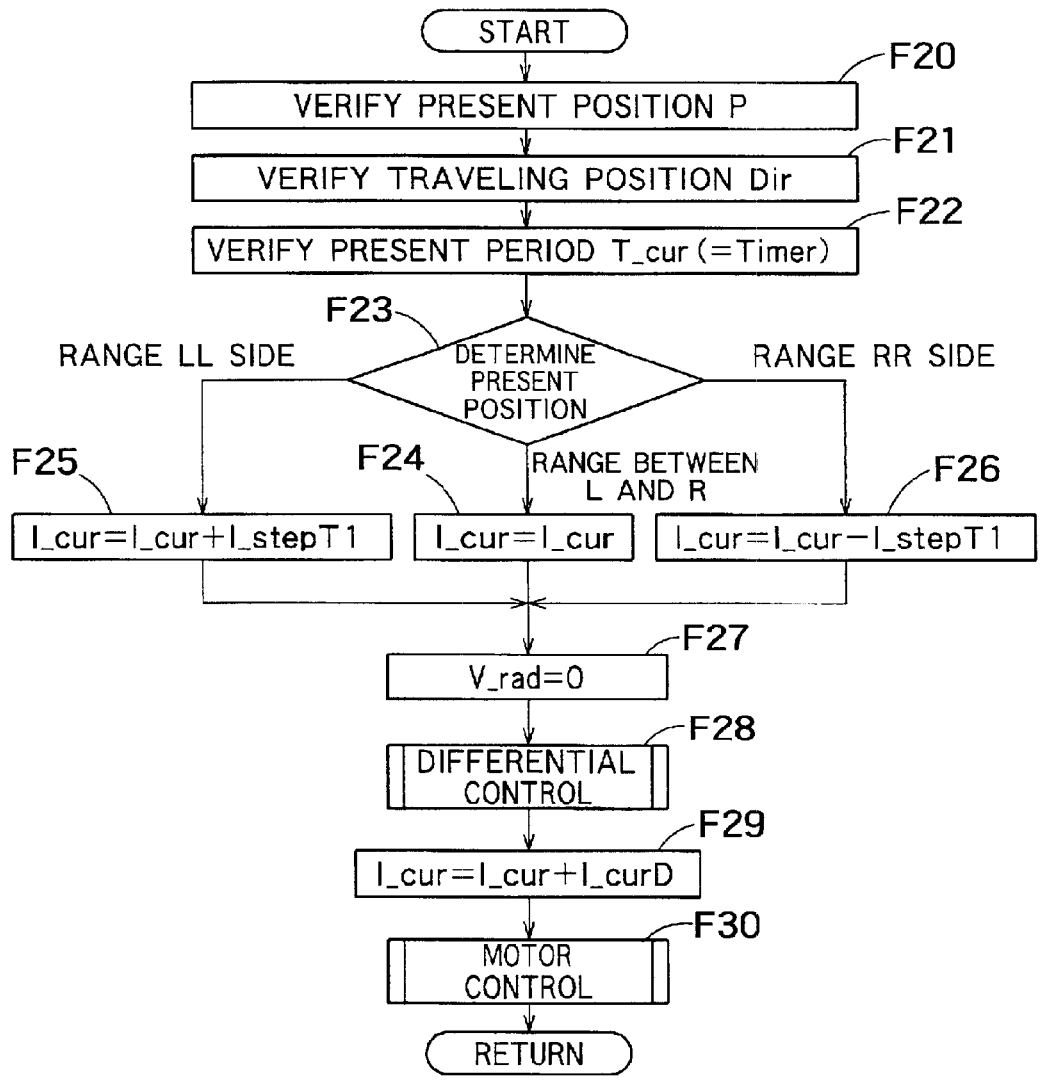
FIG. 15 is a flow chart for explaining the operation of a timer interruption control part according to the present invention.

Referring to FIG. 15, an example of the operation of the timer interruption control part 85 will be described below.

First, the present position I of the rear edge of the paper is verified (see step F20). Subsequently, the traveling direction Dir in the paper feed operation is verified (see step F21), and it is verified that the present period T-cur is Timer (see step F22).

Thereafter, on the basis of the output of the position counter 81, it is determined whether the present position of the rear edge of the paper is in the target range (between L and R) shown in FIG. 14 (see step F23). When the present position of the rear edge of the paper in the target range (between L and R), the present current value is not changed (see step F24). When the present position of the rear edge of the paper is not in the target range and is positioned on the side of LL shown in FIG. 14, the routine goes to step F25 wherein a value obtained by adding a controlled variable I-stepT1 to the present current value I-cur is set to be I-cur (I-cur=I-cur+I-stepT1). When it is determined at step F23 that the rear edge of the paper is positioned on the side of RR shown in FIG. 14, the routine goes to step F26 wherein a value obtained by subtracting the controlled variable I-stepT1 from the present current value I-cur is set to be I-cur (I-cur=I-cur−I-stepT1).

Subsequently, at step F27, a present speed coefficient V-rad is set to be zero, and at step F28, the differential control part 88 is called to calculate a differential controlled variable I-curD.

Thereafter, at step F29, a value obtained by adding the differential controlled variable I-curD to the present current value I-cur is set to be I-cur (I-cur=I-cur+I-curD). On the basis of the current value I-cur calculated at step F29, a motor control is carried out (step F30). That is, the current value I-cur is fed to the D/A converter 6j via the selecting parts 89 and 90, so that the PF motor is controlled.

Figure 16:
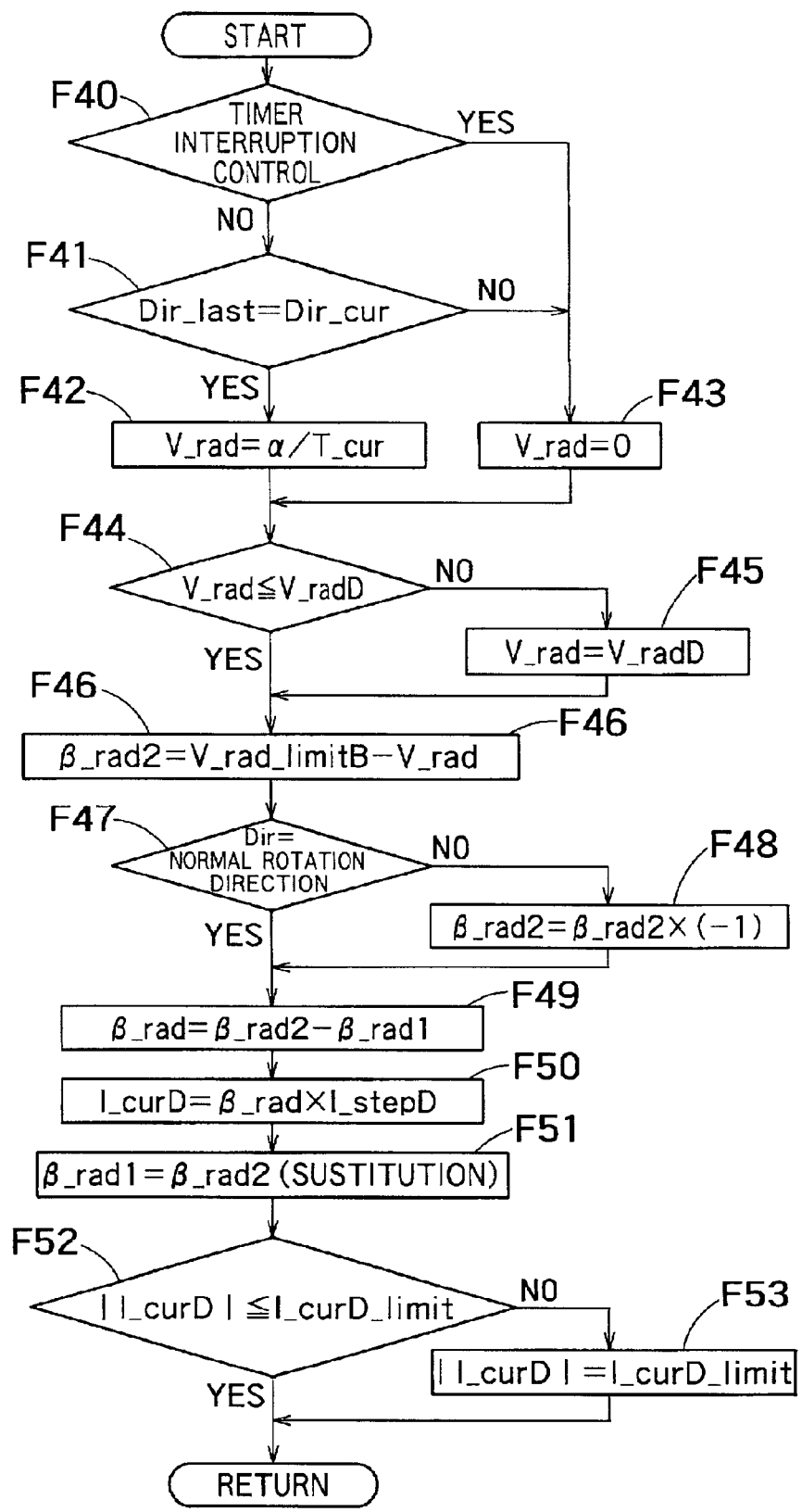
FIG. 16 is a flow chart for explaining the operation of a differential control part according to the present invention.

Referring to FIG. 16, an example of the operation of the above described differential control part 88 will be described below.

First, if the differential control part 88 is called, it is determined at step F40 whether this call is a call from the timer interruption control part 85. If it is not the call from the timer interruption control part 85, the routine goes to step S41 wherein the last traveling direction Dir-last before control is set to be the present traveling direction Dir-cur. Thereafter, at step F42, the present speed V-rad is obtained from the present period T-cur (V-rad=α/T-cur), and the routine goes to step F44. Furthermore, α is a coefficient for converting period into speed. In the case of the call from the timer interruption control part 85 at step F40, the present speed V-rad is initialized to be "0" (step F43), and the routine goes to step F44.

At step F44, the present speed V-rad is compared with the upper limit speed V-radD in the differential control. If the present speed V-rad exceeds the upper limit speed V-radD, the present speed V-rad is set to be the upper limit speed V-radD (see step F45), and the routine goes to step F46. If the present speed V-rad is the upper limit speed V-radD or less at step F44, the routine goes to step F46.

At step F46, the present speed is subtracted from a reference speed V-rad-limitB in the differential control to calculate an acceleration coefficient β-rad2. Subsequently, at step F47, it is determined whether the paper feed direction Dir is the normally rotating direction. In the case of the normally rotating direction, the routine goes directly to step F49. In the case of the reversely rotating direction, the routine goes to step F48 wherein a value obtained by multiplying the present acceleration coefficient β-rad2 by −1 is newly set to be the present acceleration coefficient β-rad2, and the routine goes to step F49.

At step F49, the last acceleration coefficient β-rad1 is subtracted from the present acceleration coefficient β-rad2 to obtain an acceleration coefficient β-rad.

Thereafter, at step F50, the obtained acceleration coefficient β-rad is multiplied by the differential controlled variable (current value) I-stepD to obtain a differential controlled variable I-curD. Thereafter, in preparation for the next differential control, the last acceleration coefficient β-rad1 is set to be the present acceleration coefficient β-rad2 (see step F51).

Then, it is determined at step F52 whether the absolute value of the obtained differential controlled variable I-curD is not greater than the upper and lower limit value I-curD-limit of the differential controlled variable. If it is not greater than the upper and lower limit, the differential controlled variable I-curD is not changed, and if it exceeds the upper and lower limit, the absolute value of the differential controlled variable I-curD is set to be equal to the upper and lower limit, to complete the differential control (see step F53). Furthermore, at this time, the sign of the differential controlled variable I-curD is set to remain the original sign.

Figure 17:
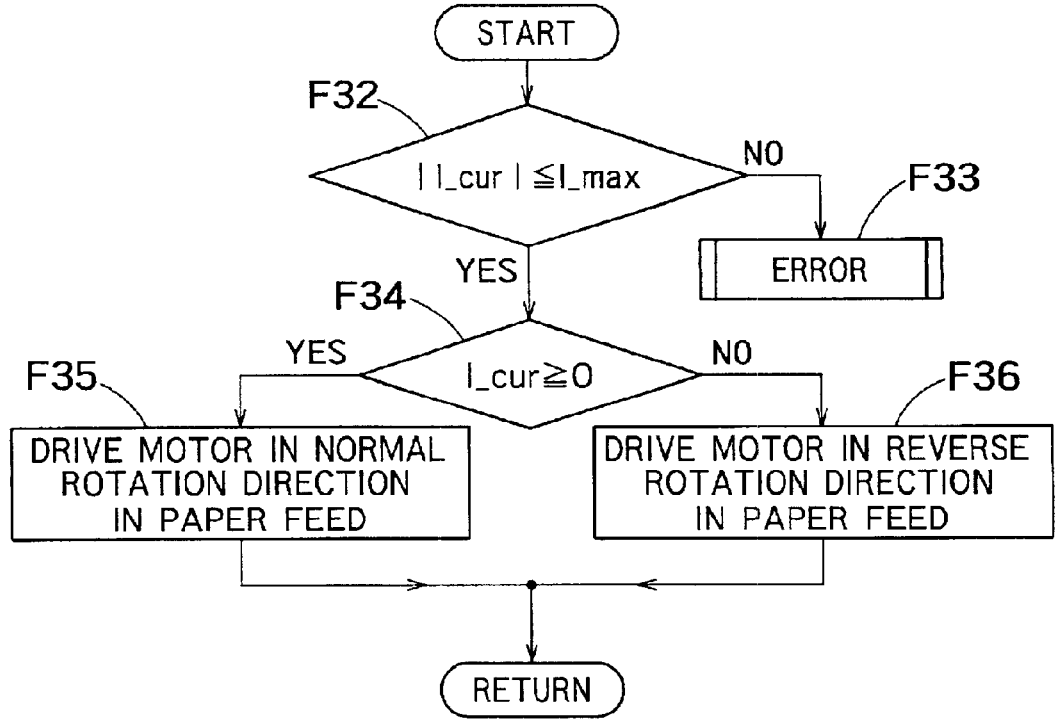
FIG. 17 is a flow chart for explaining the operation of a motor control according to the present invention.

Referring to FIG. 17, an example of the operation of the motor control described referring to FIG. 15 will be described below.

First, it is determined at step F32 whether the absolute value of the present current value I-cur is not greater than the upper and lower limit value I-max of the current value. If it exceeds the upper and lower limit value I-max, an error processing is carried out. If it is not greater than the upper and lower limit value I-max, the routine goes to step F34 wherein it is determined whether the present current value I-cur is not less than zero. If it is zero or more, the routine goes to step F35 wherein the PF motor 1 is driven in the normally rotating direction in the paper feed operation. If it is less than zero, the routine goes to step F36 wherein the PF motor 1 is driven in the reversely rotating direction in the paper feed operation. Thus, the motor control is carried out. Furthermore, referring to FIG. 18, an example of the error processing carried out at step F33 will be described. First, at step F37, an all-off-braking operation is set to stop the PF motor 1 to stop the paper feed operation. Subsequently, at step F38, an error message is outputted, and the processing is completed.

Figure 19:
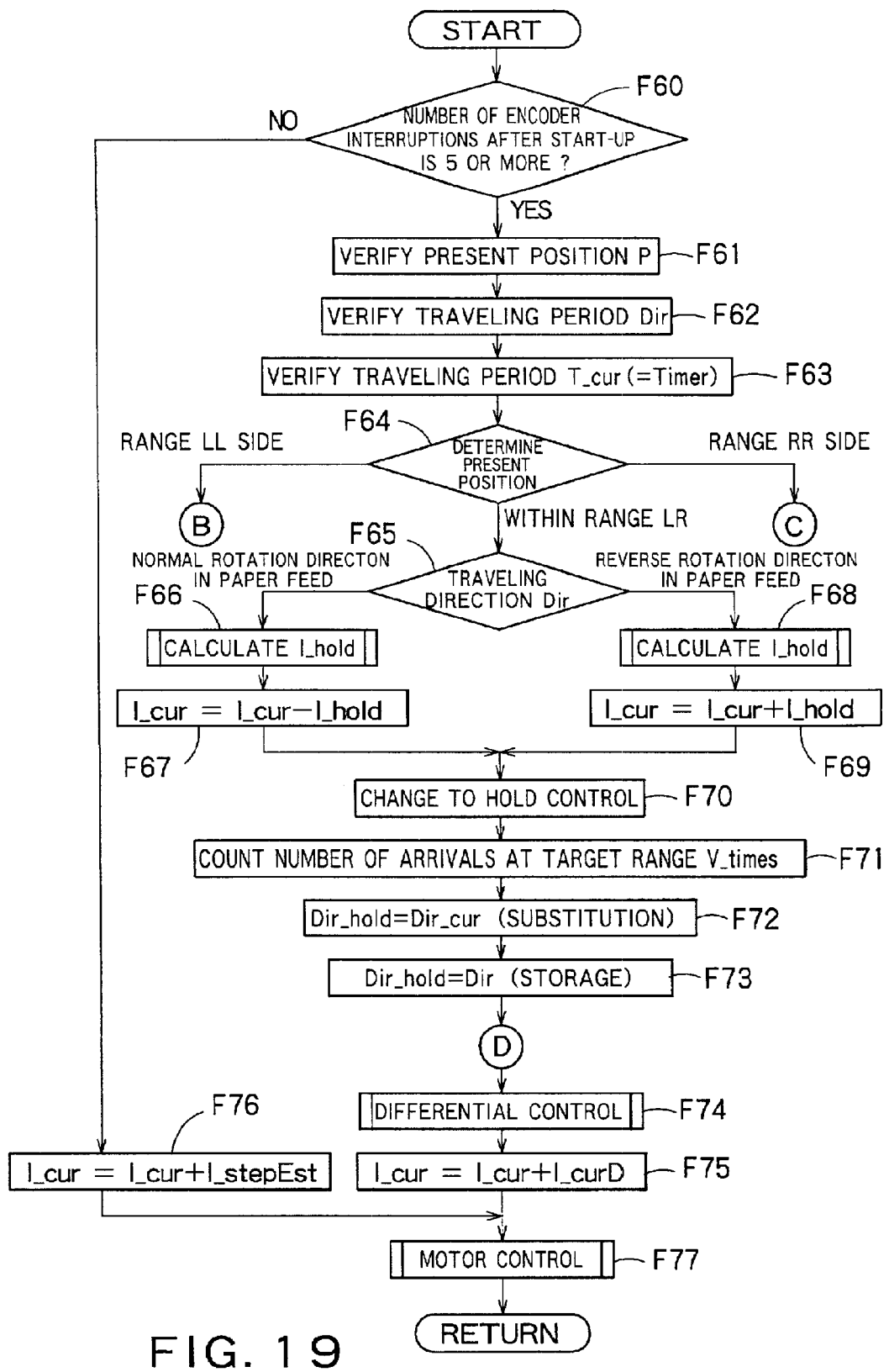
FIG. 19 is a flow chart for explaining the operation of an encoder interruption control part according to the present invention.
Figure 20:
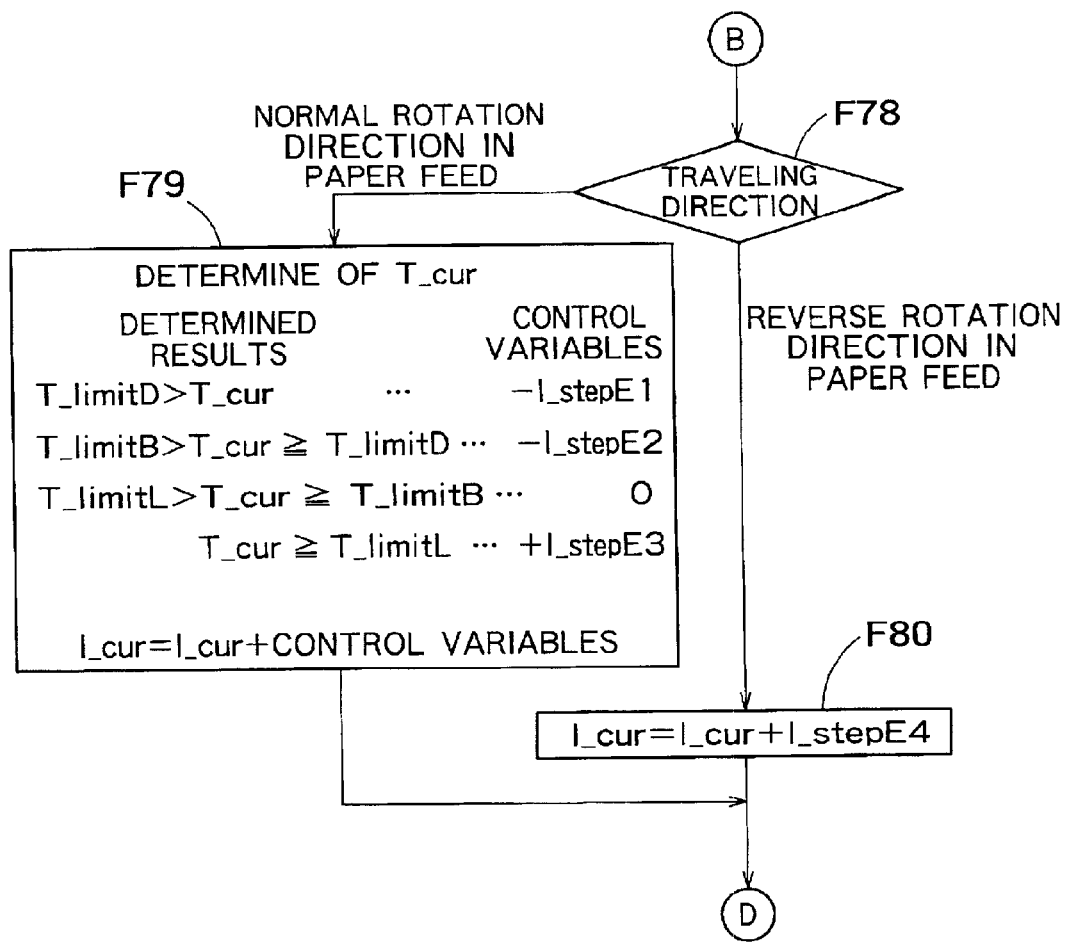
FIG. 20 is a flow chart for explaining the operation of an encoder interruption control part according to the present invention.
Figure 21:
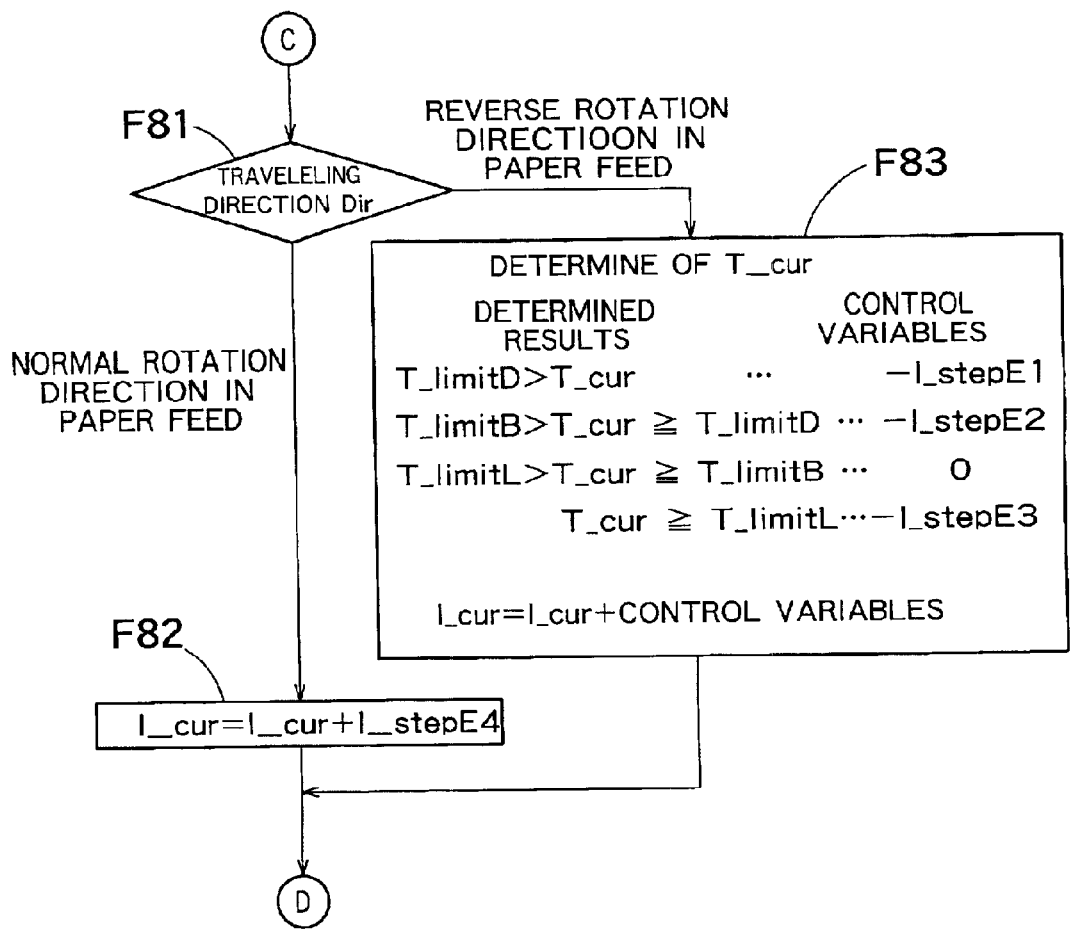
FIG. 21 is a flow chart for explaining the operation of an encoder interruption control part according to the present invention.

Referring to FIGS. 19 through 21, an example of the operation of the encoder interruption control part 86 will be described below.

First, at step F60, after the PF motor 1 is started for the present control, it is determined whether the number of calls for the encoder interruption control part 86 is five or more. If it is four or less, the routine goes to step F76 shown in FIG. 20 wherein the initial value I-stepESt of the encoder interruption controlled variable is added to the present current value I-cur. Thereafter, at step F77, the above described motor control is carried out.

It is determined at step F60 that the number of calls for the encoder interruption control part 86 is five or more, the verification of the present position P of the rear edge of the paper (see step F61), the verification of the traveling direction Dir in the paper feed operation (see step F62), and the verification of the present period T-cur (see step F63) are carried out.

Thereafter, at step F64, the present position of the rear edge of the paper is determined. If the rear edge of the paper is positioned in the target range (between L and R) shown in FIG. 14, the routine goes to step F65 wherein the traveling direction Dir in the paper feed operation is determined. If the traveling direction Dir is the normally rotating direction in the paper feed operation, the calculation of a hold current value I-hold, which will be described below, is carried out (see step F66). Subsequently, at step F66, a value obtained by subtracting the hold current value I-hold from the present current value I-cur is newly set to be the present current value I-cur. If the traveling direction is the reversely rotating direction in the paper feed operation, the routine goes to step F68 wherein the calculation of the hold current value I-hold is carried out. Subsequently, at step F69, a value obtained by adding the hold current value I-hold to the present current value I-cur is newly set to be the present current value I-cur.

Then, at step F70, the operation is changed to a hold control, and the number V-times of arrivals at the target range is counted (see step F71). Then, the target range rushing direction Dir-hold is set to be the present traveling direction Dir-cur (see step F72), and the present traveling direction Dir-cur is set to be the traveling direction Dir (step F73).

Subsequently, at step F74, the differential control part 88 is called to calculate a differential controlled variable I-curD. Thereafter, at step F75, a value obtained by adding the differential controlled variable I-curD to the present current value I-cur is newly set to be the present current value I-cur.

Subsequently, a motor control is carried out on the basis of the present current value (see step F77).

Referring to FIG. 19 again, it is determined at step F64 shown in FIG. 19 that the present position of the rear edge of the paper is arranged on the side of the range LL shown in FIG. 14, the routine goes to step F78 shown in FIG. 20. At step F78, if the traveling direction Dir-cur in the paper feed operation is the normally rotating direction in the paper feed operation, the routine goes to step F79, and if it is the reversely rotating direction in the paper feed operation, the routine goes to step F80.

At step 79, the present period T-cur is compared with the encoder period T-limitD at the upper limit speed, the encoder period T-limitB (>T-limitD) at the reference speed, and the encoder period T-limitL (>T-limitB) at the lower limit speed, and a controlled variable is determined in accordance with the compared results. Then, a value obtained by adding the determined controlled variable to the present current value I-cur is newly set to be the present current value I-cur (see step F79). Thereafter, the routine goes to step F74 shown in FIG. 19, and a differential control is carried out. The controlled variable determined at step F79 is as follows. If the present period T-cur is smaller than T-limitD, the controlled value is −I-stepE1, and if T-cur is T-limitD or more and less than T-limitB, the controlled variable is −I-stepE2. In addition, if T-cur is T-limitB or more and less than T-limitL, the controlled variable is zero, and if T-cur is T-limitL or more, the controlled variable is +I-stepE3.

At step F80, a value obtained by adding the controlled variable I-stepE4 to the present current value I-cur is newly set to be the present current value I-cur. Thereafter, the routine goes to step F74 shown in FIG. 19, and a differential control is carried out.

Referring to FIG. 19 again, at step F64 shown in FIG. 19, if the present position of the rear edge of the paper is arranged on the side of the range RR shown in FIG. 14, the routine goes to step F81 shown in FIG. 21. At step F81, if the traveling direction Dir-cur in the paper feed operation is the normally rotating direction in the paper feed direction, the routine goes to step F82, and if it is the reversely rotating direction in the paper feed operation, the routine goes to step F83.

At step F82, a value obtained by adding the controlled variable I-stepE4 to the present current value I-cur is newly set to be the present current value I-cur. Therefore, the routine goes to step F74 shown in FIG. 19, and a differential control is carried out.

At step F83, the present period T-cur is compared with T-limitD, T-limitB and T-limitL, and a controlled variable is determined in accordance with the compared results. Then, a value obtained by adding the determined controlled variable to the present current value I-cur is newly set to be the present current value I-cur (see step F83). Thereafter, the routine goes to step F74 shown in FIG. 19, and a differential control is carried out.

The controlled variable determined at step F83 is as follows. If the present period T-cur is less than T-limitD, the controlled variable is +I-stepE1, and if T-cur is T-limitD or more and less than T-limitB, the controlled variable is +I-stepE2. In addition, if T-cur is T-limitB or more and less than T-limitL, the controlled variable is zero, and if T-cur is T-limitL or more, the controlled variable is −I-stepE3.

Figure 22:
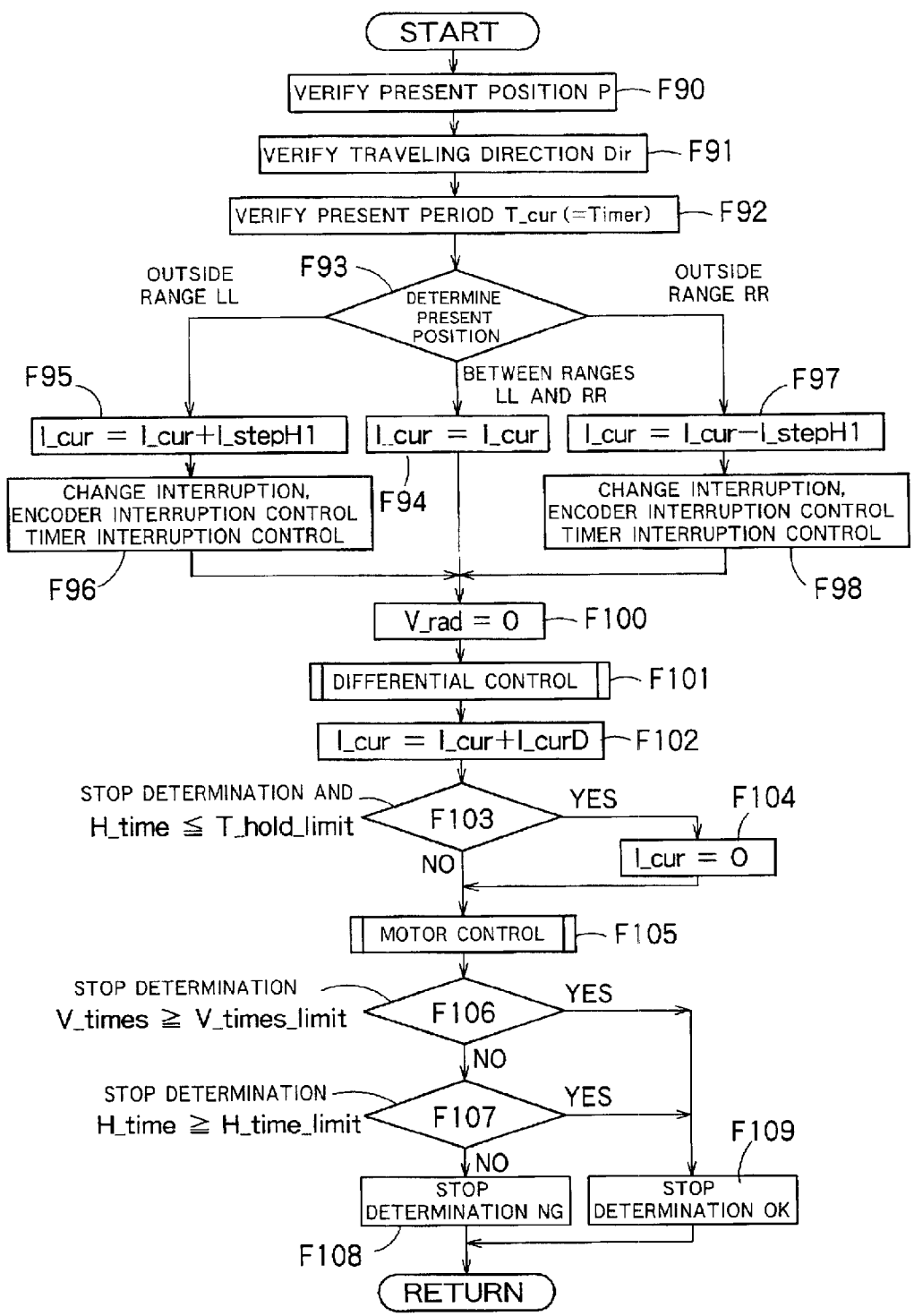
FIG. 22 is a flow chart for explaining the operation of a hold control part according to the present invention.

Referring to FIG. 22, an example of the operation of the hold control part 87 will be described below.

First, the verification of the present position P of the rear edge of the paper, the verification of the traveling direction Dir, and the verification of the present period T-cur are carried out (see steps F90, F91 and F92).

Then, at step F93, the present position of the rear edge of the paper is determined. If the present position of the rear edge of the paper is within the stop allowable range LL~RR shown in FIG. 14, the routine goes to step F94 wherein the present current value I-cur is newly set to be the present current value. Thereafter, the routine goes to step F100.

At step F93, if the rear edge of the paper is positioned outside of the point LL, a value obtained by adding the controlled variable I-stepH1 to the present current value I-cur is set to be the present current value (see step F95). Thereafter, at step F96, the encoder interruption control part 86 or the timer interruption control part 85 is called by the control selecting part 84, and an encoder interruption control or a timer interruption control is carried out. Thereafter, the routine goes to step F100.

At step F93, if the rear edge of the paper is positioned outside of the point RR, a value obtained by subtracting the controlled variable I-stepH1 from the present current value I-cur is newly set to be the present current value I-cur (see step F97). Thereafter, at step F98, the encoder interruption control part 86 and the timer interruption control part 85 is called by the control selecting part 84, and an encoder interruption control or a timer interruption control is carried out. Thereafter, the routine goes to step F100.

At step F100, the present speed coefficient V-rad is initialized to be "0". Thereafter, at step F101, the differential control part 88 is called to obtain a differential controlled variable I-curD. Then,at step F102, a value obtained by adding the differential controlled variable I-curD to the present current value I-cure is newly set to be the present current value.

Then, at step F103, it is determined whether the paper feed operation is stopped and the stop time is not greater than the upper limit value T-hold-limit. If the stop time exceeds the upper limit value T-hold-limit, the present current value I-cur is not changed, and the routine goes to step F105. If the stop time is not greater than the upper limit value T-hold-limit, the present current value I-cur is set to be "0", and the routine goes to step F105.

At step F105, the above described motor control is carried out. Thereafter, the routine goes to step F106 wherein it is determined whether the number of entrances to the hold control from the timer interruption control or the encoder interruption control, i.e., the number of variations V-times, is not less than the number of stop determining vibrations V-time-limit. If it is not less than the number of stop determining vibrations, the routine goes to step F109 wherein it is determined that the stop determination is OK. If it is less than the number of stop determining vibrations, the routine goes to step F107.

At step F107, it is determined whether the stop time H-time is not less than the stop determining time H-time-limit. If it is not less than the stop determining time, the routine goes to step F109 wherein it is determined that the stop determination is OK. If it is less than the stop determining time, the routine goes to step F108 wherein it is determined that the stop determination is NG.

Finally, referring to FIG. 23, the calculation of the hold current value I-hold used for the encoder interruption control will be described below.

First, at step F120, it is determined whether the number of vibrations V-times is 1. If the number of vibrations V-times is equal to 1, the routine goes to step F121 wherein the hold current value I-hold is set to be the hold reference current I-hold-base. If the number of vibrations V-times is not equal to 1, the routine goes to step F122 wherein it is determined whether the present traveling direction Dir-cur in the paper feed operation is equal to the target range rushing direction Dir-hold. If it is equal to the target range rushing direction Dir-hold, the routine goes to step F123 wherein a value obtained by subtracting the hold current correction value I-hold-ad from the present hold current I-hold is set to be a new hold current value I-hold. At step F122, if it is not equal to the target range rushing direction Dir-hold, the routine goes to step F124 wherein a value obtained by adding the hold current correction I-hold-ad to the present hold current value I-hold is set to be a new hold current value I-hold.

As described above, according to the print control system in this preferred embodiment, the rear edge of the paper can be held in the paper rear edge holding region, and the paper feed precision can be ensured even in the vicinity of the rear edge of the paper.

The present invention is particularly effective when a servomotor (DC motor, AC motor) is used for controlling an object to be controlled as follows.

That is, the present invention is effective:

a) in a case where the control is changed to the control of the present invention to carry out a positioning control after the positioning is roughly carried out by the PID control when a positioning control is precisely carried out;
b) in a case where the control is changed to the control of the present invention to carry out a positioning control after a speed control is roughly carried out to a target position (e.g., the control of a pump motor or the like for operating a suction pump for ink in the case of a printer);
c) in a case where a paper is fed while a torque is held in order to separate the paper in a paper storage portion;
d) in a case where the control of the present invention is applied to cope with a load generating when a continuous paper is cut by a cutter mounted on a carriage; and
e) in a case where the control of the present invention is applied when a thick paper is fed at a low speed.

Figure 24:
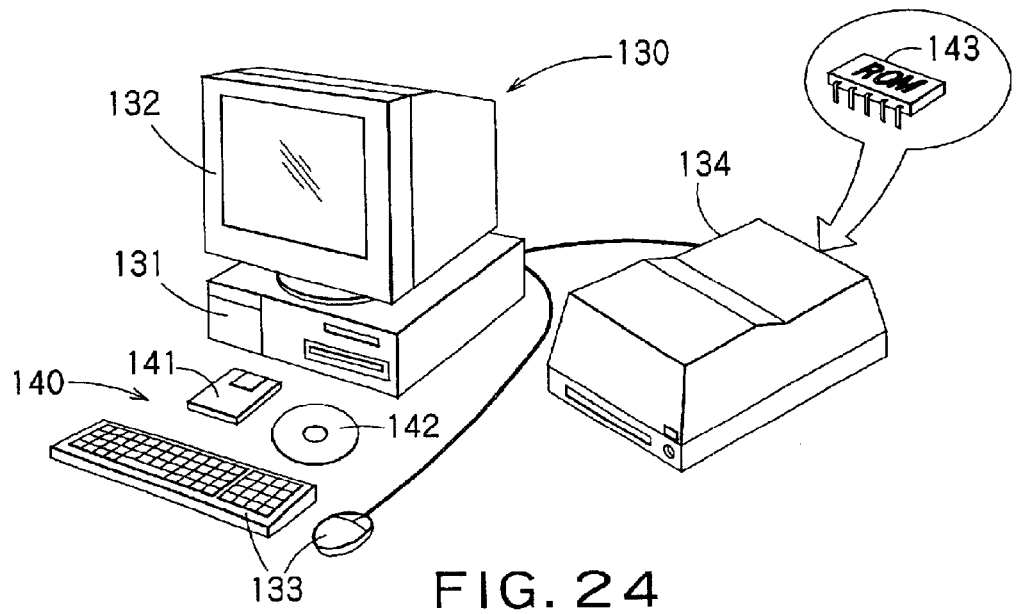
FIG. 24 is a perspective view of an example of a computer system using a recording medium in which a motor control program according to the present invention has been recorded.
Figure 25:
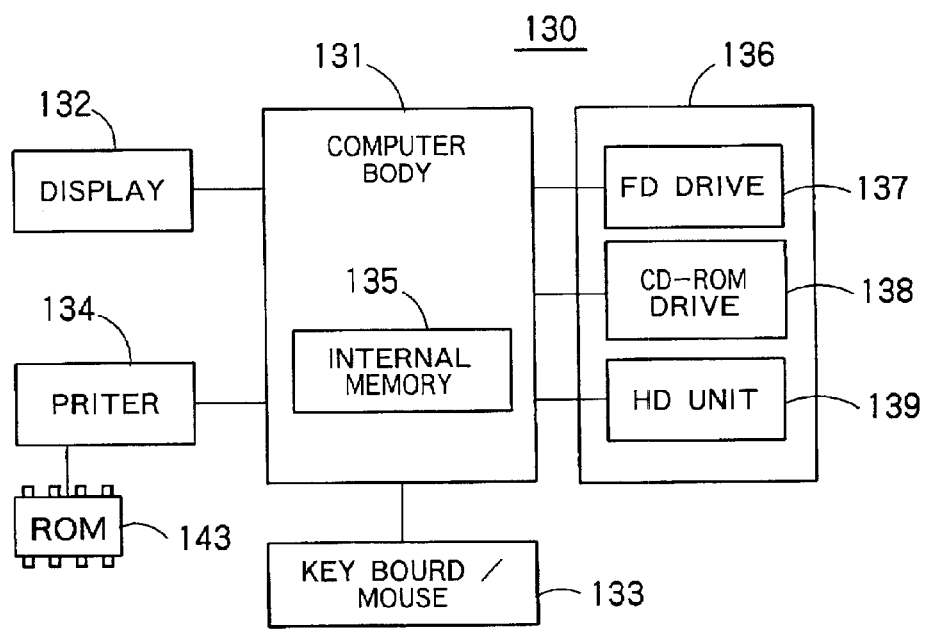
FIG. 25 is a block diagram of an example of a computer system using a recording medium in which a motor control program according to the present invention has been recorded.

Referring to FIGS. 24 and 25, a preferred embodiment of a recording medium, in which a motor control program has been recorded, according to the present invention will be described below.

FIGS. 24 and 25 are a perspective view and block diagram showing an example of a computer system 130 which uses a recording medium in which a motor control program in this preferred embodiment has been recorded.

In FIG. 24, the computer system 130 comprises a computer body 130 including a CPU, a display unit 132, such as a CRT, an input unit 133, such as a keyboard or mouse, and a printer 134 for carrying out a print.

As shown in FIG. 25, the computer body 131 comprises an internal memory 135 of a RAM, and a built-in or exterior memory unit 136. As the memory unit 136, a flexible or floppy disk (FD) drive 137, a CD-ROM drive 138 and a hard disk drive (HD) unit 139 are mounted. As shown in FIG. 24, a flexible disk or floppy disk (FD) 141 which is inserted into a slot of the FD drive 137 to be used, a CD-ROM 142 which is used for the CD-ROM drive 138, or the like is used as a recording medium 140 for use in the memory unit 136.

As shown in FIGS. 24 and 25, it is considered that the FD 141 or the CD-ROM 142 is used as the recording medium 140 for use in a typical computer system. However, since this preferred embodiment particularly relates to a control program for use in the printer 134, the motor control program of the present invention may be recorded in, e.g., a ROM chip 143 serving as a nonvolatile memory which is built in the printer 134.

Of course, the recording medium may be any one of FDs, CD-ROMs, MO (Magneto-Optical) disks, DVDs (Digital Versatile Disks), other optical recording disks, card memories, and magnetic tapes.

Figure 18:
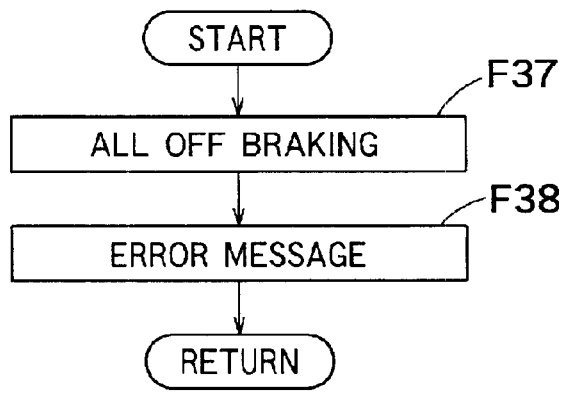
FIG. 18 is a flow chart for explaining the operation of an error processing according to the present invention.
Figure 23:
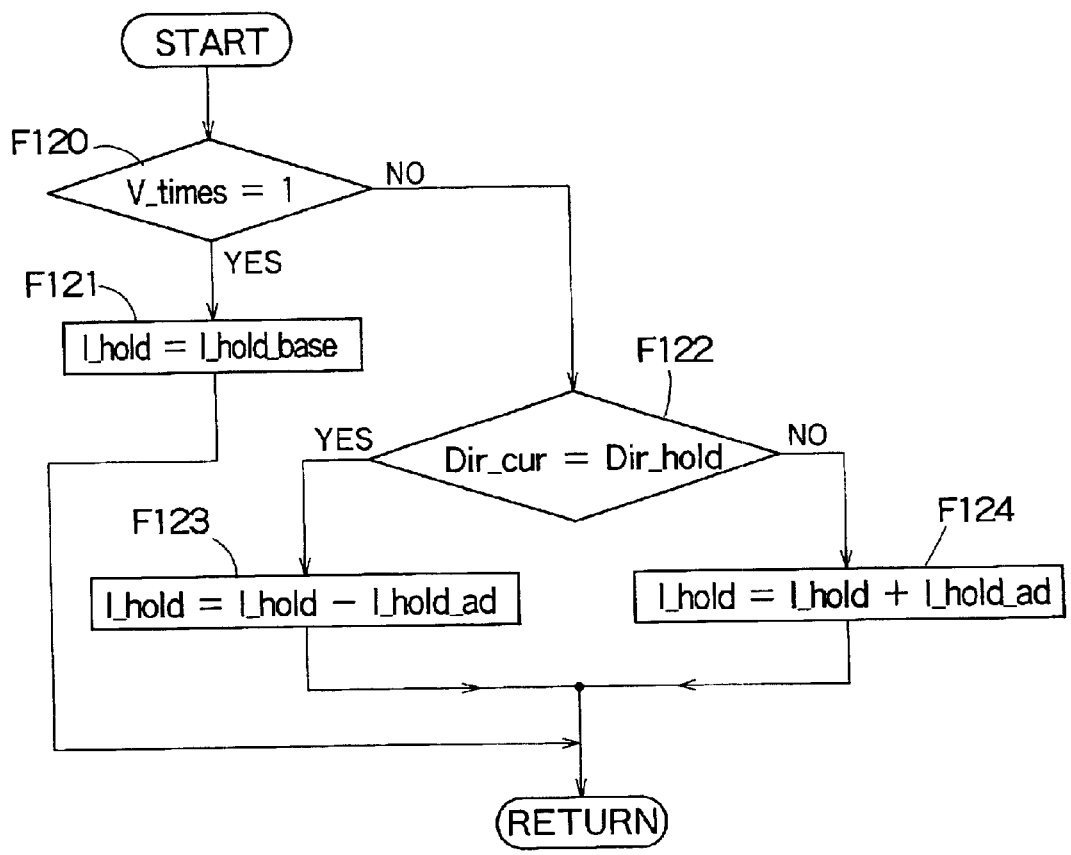
FIG. 23 is a flow chart for explaining the calculation of a hold current according to the present invention.

The recording medium 140 in this preferred embodiment is designed to carry out a control procedure including steps F1 through F6 shown in FIG. 11, a control procedure including steps F10 through F17 shown in FIG. 13, a control procedure including steps F20 through F30 shown in FIG. 15, a control procedure including steps F40 through F53 shown in FIG. 16, a control procedure including steps F32 through F36 shown in FIG. 17, a control procedure including steps F37 through F38 shown in FIG. 18, a control procedure including steps F60 through F77 shown in FIG. 19, a control procedure including steps F78 through F80 shown in FIG. 20, a control procedure including steps F81 through F83 shown in FIG. 21, a control procedure including steps F90 through F109 shown in FIG. 22, and a control procedure including steps F120 through F124 shown in FIG. 23.

As described above, according to the present invention, it is possible to ensure a paper feed precision even in the vicinity of the rear edge of a paper.

Although each control is executed on the basis of the current values in the above-described embodiment according to the present invention, each control may be executed on the basis of the voltage values.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A print control system comprising:
   a position detecting part for detecting the position and traveling direction of an object to be controlled, which is controlled by a servomotor,
   a speed detecting part for detecting a physical quantity corresponding to the speed of said object to be controlled;
   a first control part for determining a current value or a voltage value, which is to be added to said servomotor, on the basis of the output of said position detecting part so that said object to be controlled is positioned within a target range, and for controlling said servomotor on the basis of the determined current value or the determined voltage value;
   a second control part for determining a current value or a voltage value, which is added to said servomotor, on the basis of the output of each of said position detecting part and said speed detecting part so that said object to be controlled is positioned within said target range, and for controlling said servomotor on the basis of the determined current value or the determined voltage value;
   a third control part for determining a current value or a voltage value of said servomotor on the basis of the output of said position detecting part so that said object to be controlled is stopped within a predetermined range, and for controlling said servomotor on the basis of the determined current value or the determined voltage value; and
   a control selecting part, which operates in a predetermined timing, for determining whether said object to be controlled is positioned within said target range on the basis of the output of said position detecting part, said control selecting part selecting said third control part when said object to be controlled is positioned within said target range, and selecting said first or second control part on the basis of the output of said speed detecting part when said object to be controlled is positioned out of said target range, said control selecting part causing the selected control part to control said servomotor.

2. A print control system as set forth in claim 1, which further comprises a differential control part, which is called to operate when each of said first through third control parts operates, for deriving a speed deviation of a speed of said object to be controlled during each operation from a reference speed and for calculating a current value or a voltage value which is in proportion to the difference between a speed deviation during the present operation and a speed deviation during the last operation.

3. A print control system as set forth in claim 1, which further comprises a differential control part, which is called to operate when each of said first through third control parts operates, for deriving a speed deviation of a speed of said object to be controlled during each operation from a reference speed and for calculating a current value or a voltage value which is obtained by multiplying the difference between a speed deviation during the present operation and a speed deviation during the last operation by a constant corresponding to said speed deviation.

4. A print control system as set forth in claim 1, wherein said position detecting part detects leading and trailing edges of an output pulse of an encoder which generates an output pulse in accordance with the rotation of said servomotor, said position detecting part having a counter which counts up the detected edges when said servomotor is normally rotating, and counts down the detected edges when said servomotor is reversely rotating, said position detecting part outputting a pulse in synchronism with said leading and trailing edges.

5. A print control system as set forth in claim 4, wherein said control selecting part has a timer counter in which a counted value is reset when the counted value reaches a set value or when a pulse is received from said position detecting part, said control selecting part selecting said first control part when said control selecting part receives no pulse from said position detecting part even if the counted value of said timer counter reaches said set value in a case where said object to be controlled is positioned out of said target range, and said control selecting part selecting said second control part when said control selecting part receives a pulse from said position detecting part before the counted value of said timer counter reaches said set value in a case where said object to be controlled is positioned out of said target range.

6. A print control system as set forth in claim 1, wherein when said first control part is selected by said control selecting part,
   if the position of said object to be controlled has not exceeded said target position or if the position of said object to be controlled has exceeded said target position and also has exceeded said target range, said first control part adds or subtracts a predetermined change current value or a predetermined change voltage value to or from a current value a voltage value which is currently applied to said servomotor, and controls said servomotor on the basis of the calculated result, and if the position of said object to be controlled is within said target range, said first control part controls said servomotor on the basis of a current value or a voltage value which is applied to said servomotor.

7. A print control system as set forth in claim 1, wherein when said second control part is selected by said control selecting part, if the position of said object to be controlled has not exceeded said target position or if the position of said object to be controlled has exceeded said target position and also has exceeded said target range, said second control part compares the output of said speed detecting part with a threshold to select a predetermined change current value or a predetermined change voltage value on the basis of the compared result to calculate a current value or a voltage value, which is to be applied to said servomotor, on the basis of the selected change current value or the selected change voltage value and a current value or a voltage value, which is currently applied to said servomotor, so that said object to be controlled is positioned within said target range, and controls said servomotor on the basis of the calculated current value or the calculated voltage value, and if the position of said object to be controlled is within said target range, said second control part subtracts a predetermined current value or a predetermined voltage value from a current value or a voltage value, which is applied to said servomotor, in the opposite direction to a current value or a voltage value in the traveling direction of said object to be controlled, and controls said servomotor on the basis of the subtracted result.

8. A print control system as set forth in claim 7, wherein said speed detecting part has a time measuring part for detecting leading and trailing edges of an output pulse of said encoder and for measuring a time between adjacent edges, said speed detecting part outputting the measured result.

9. A print control system as set forth in claim 1, wherein when said third control part is selected by said control selecting part, said third control part determines whether said object to be controlled is positioned within a predetermined allowable range including said target range, said third control part operating said first or second control part via said control selecting part when said object to be controlled is positioned out of said predetermined allowable range.

10. A print control system comprising:

a paper rear edge holding/driving control part for driving and controlling a paper feed motor so as to hold the rear edge of a paper, which is fed by said paper feed motor, in a predetermined holding region;

a paper feed control part for controlling said paper feed motor so as to carry out the whole paper feed operation other than a paper rear edge operation; and a control selecting part for selecting one of said paper rear edge holding/driving control part and said paper feed control part on the basis of the kind and feed amount of said paper and the presence of detection of the rear edge of said paper.

11. A print control system as set forth in claim 10, wherein said paper rear edge holding/driving control part comprises:

a position detecting part for detecting the position and traveling direction of said paper;

a speed detecting part for detecting a physical quantity corresponding to the feed speed of said paper;

a first control part for determining a current value or a voltage value, which is to be added to said paper feed motor, on the basis of the output of said position detecting part so that the rear edge of said paper is positioned within a target range, and for controlling said paper feed motor on the basis of the determined current value or the determined voltage value;

a second control part for determining a current value or a voltage value, which is to be added to said paper feed motor, on the basis of the output of each of said position detecting part and said speed detecting part so that the rear edge of said paper is positioned within said target range, and for controlling said paper feed motor on the basis of the determined current value or the determined voltage value;

a third control part for determining a current value or a voltage value of said paper feed motor on the basis of the output of said position detecting part so that the rear edge of said paper is stopped within a predetermined range, and for controlling said paper feed motor on the basis of the determined current value or the determined voltage value; and a second control selecting part, which operates in a predetermined timing, for determining whether the rear edge of said paper is positioned within said target range on the basis of the output of said position detecting part, said second control selecting part selecting said third control part when the rear edge of said paper is positioned within said target range, and selecting said first or second control part on the basis of the output of said speed detecting part when the rear edge of said paper is positioned out of said target range, said second control selecting part causing the selected control part to control said paper feed motor.

12. A print control system as set forth in claim 11, wherein said paper rear edge holding/driving control part further comprises a differential control part, which is called to operate when each of said first through third control parts operates, for deriving a speed deviation of a feed speed of said paper during each operation from a reference speed and for calculating a current value or a voltage value which is in proportion to the difference between a speed deviation during the present operation and a speed deviation during the last operation.

13. A print control system as set forth in claim 11, wherein said paper rear edge holding/driving control part further comprises a differential control part, which is called to operate when each of said first through third control parts operates, for deriving a speed deviation of a feed speed of said paper during each operation from a reference speed and for calculating a current value or a voltage value which is obtained by multiplying the difference between a speed deviation during the present operation and a speed deviation during the last operation by a constant corresponding to said speed deviation.

14. A print control system as set forth in claim 11, wherein said position detecting part detects leading and trailing edges of an output pulse of an encoder which generates an output pulse in accordance with the rotation of said paper feed motor, said position detecting part having a counter which counts up the detected edges when said paper feed motor is normally rotating, and counts down the detected edges when said paper feed motor is reversely rotating, said position detecting part outputting a pulse in synchronism with said leading and trailing edges.

15. A print control system as set forth in claim 14, wherein said second control selecting part has a timer counter in which a counted value is reset when the counted value reaches a set value or when a pulse is received from said position detecting part, said second control selecting part selecting said first control part when no pulse is received from said position detecting part even if the counted value of said timer counter reaches said set value in a case where the rear edge of said paper is positioned out of said target range, and said second control selecting part selecting said second control part when a pulse is received from said position detecting part before the counted value of said timer counter reaches said set value in a case where the rear edge of said paper is positioned out of said target range.

16. A print control system as set forth in claim 11, wherein when said first control part is selected by said second control selecting part, if the position of the rear edge of said paper has not exceeded said target position or if the position of the rear edge of said paper has exceeded said target position and also has exceeded said target range, said first control part adds or subtracts a predetermined change current value or a predetermined change voltage value to or from a current value or a voltage value which is currently applied to said paper feed motor, and controls said paper feed motor on the basis of the calculated result, and if the position of the rear edge of said paper is within said target range, said first control part controls said paper feed motor on the basis of a current value or a voltage value which is applied to said paper feed motor.

17. A print control system as set forth in claim 11, wherein when said second control part is selected by said second control selecting part, if the position of the rear edge of said paper has not exceeded said target position or if the position of the rear edge of said paper has exceeded said target position and also has exceeded said target range, said second control part compares the output of said speed detecting part with a threshold to select a predetermined change current value or a predetermined change voltage value on the basis of the compared result to calculate a current value or a voltage value, which is to be applied to said paper feed motor, on the basis of the selected change current value or the selected change voltage value and a current value or a voltage value, which is currently applied to said paper feed motor, so that the rear edge of said paper is positioned within said target range, and controls said paper feed motor on the basis of the calculated current value or the calculated voltage value, and if the position of the rear edge of said paper is within said target range, said second control part subtracts a predetermined current value or a predetermined voltage value from a current value or a voltage value, which is applied to said paper feed motor, in the opposite direction to a current value or a voltage value in the traveling direction of said paper, and controls said paper feed motor on the basis of the subtracted result.

18. A print control system as set forth in claim 17, wherein said speed detecting part has time measuring part for detecting leading and trailing edges of an output pulse of said encoder, and for measuring a time between adjacent edges, said speed detecting part outputting the measured result.

19. A print control system as set forth in claim 11, wherein when said third control part is selected by said second control selecting pail, said third control part determines whether the rear edge of said paper is positioned within a predetermined allowable range including said target range, said third control part operating said first or second control part via said second control selecting part when the edge of said paper is positioned out of said predetermined allowable range.

20. A print control method for use in a print system comprising:

a position counter having a counter for detecting leading and trailing edges of an output pulse of an encoder which operates integrally with a paper fed by a paper feed motor, and for counting so as to count up the detected edges when said paper feed motor is normally rotating and so as to count down the detected edges when said paper feed motor is reversely rotating, said position counter outputting a pulse in synchronism with said leading and trailing edges;

a period counter for detecting leading and trailing edges of an output pulse of said encoder and for measuring a time between adjacent edges; and a timer counter having a set value, the counted value of said timer counter being reset when the counted value reaches said set value or when said timer counter receives a pulse from said position counter, said print control method comprising the steps of:

comparing the counted value of said position counter with a target position of the rear edge of said paper when a pulse is received from said position counter or when the counted value of said timer counter reaches said set value;

carrying out a hold control so that the rear edge of said paper is stopped within an allowable range including a target range including said target position, on the basis of the output of said position counter and a control parameter when the position of the rear edge of said paper is within said target range;

carrying out a timer interruption control so that the rear edge of said paper is positioned within said target range, on the basis of the output of said position counter when no pulse is received from said position counter even if the counted value of said timer counter reaches said set value in a case where the position of the rear edge of said paper is out of said target range; and carrying out an encoder interruption control so that the position of the rear edge of said paper is within said target range, on the basis of the output of said position counter and the output of said period counter when a pulse is received from said position counter before the counted value of said timer counter reaches said set value in a case where the rear edge of said paper is not within said target range.

21. A print control method as set forth in claim 20, wherein said step of carrying out the timer interruption control comprising the steps of:

adding or subtracting said change current value or said change voltage value to or from a current value or a voltage value, which is currently applied to said paper feed motor, when the position of the rear edge of said paper has not exceed said target position or when the position of the rear edge of said paper has exceeded said target position and also has exceeded said target range, and controlling said paper feed motor on the basis of the calculated result; and controlling said paper feed motor on the basis of a current value or a voltage value, which is applied to said paper feed motor, when the position of the rear edge of said paper is within said target range.

22. A print control method as set forth in claim 20, wherein said step of carrying out the encoder interruption control comprising the steps of:

comparing the output of said period counter with a threshold to select a predetermined change current value or a predetermined change voltage value on the basis of the compared result to calculate a current value or a voltage value, which is to be applied to said paper feed motor, on the basis of the selected change current value or the selected change voltage value and a current value or a voltage value, which is currently applied to said paper feed motor, so that the rear edge of said paper is positioned within said target range, and controlling said paper feed motor on the basis of the calculated current value or the calculated voltage value, if the position of the rear edge of said paper has not exceeded said target position or if the position of the rear edge of said paper has exceeded said target position and also has exceeded said target range; and subtracting a predetermined current value or a predetermined voltage value from a current value or a voltage value, which is applied to said paper feed motor, in the opposite direction to a current value or a voltage value in the traveling direction of said paper, and controlling said paper feed motor on the basis of the subtracted result, if the position of the rear edge of said paper is within said target range.

23. A print control method as set forth in claim 20, wherein said step of carrying out the hold control including a step of determining whether the position of the rear edge of said paper is within a predetermined allowable range including said target range, and operating said timer interruption control or said encoder interruption control when the position of the rear edge of said paper is not within said allowable range.

24. A recording medium in which a print control program for controlling a print by means of a computer has been recorded, said print control program comprising:

the procedure for comparing the counted value of a position counter for detecting the present position and the traveling direction of a paper with the position of the rear edge of said paper when a pulse is received from said position counter or when the counted value of a timer counter reaches a set value;

the procedure for carrying out a hold control so that the rear edge of said paper is stopped within an allowable range including a target range including said target position, on the basis of the output of said position counter when the position of the rear edge of said paper is within said target range;

the procedure for carrying out a timer interruption control so that the rear edge of said paper is positioned within said target range, on the basis of the output of said position counter when no pulse is received from said position counter even if the counted value of said timer counter reaches said set value in a case where the position of the rear edge of said paper is not within said target range; and the procedure for carrying out an encoder interruption control so that the position of the rear edge of said paper is within said target range, on the basis of the output of said position counter and the output of a period counter for detecting leading and trailing edges of an output pulse of an encoder and for measuring a time between adjacent edges, when a pulse is received from said position counter before the counted value of said timer counter reaches said set value in a case where the rear edge of said paper is not within said target range.

* * * * *